United States Patent
Eckenwiler et al.

(10) Patent No.: US 7,085,687 B2
(45) Date of Patent: Aug. 1, 2006

(54) METHOD AND APPARATUS FOR MANUFACTURING PACKAGING OPTIMIZATION

(75) Inventors: William F. Eckenwiler, Ortonville, MI (US); Philip Verdura, West Bloomfield, MI (US); Larry G. Lagrange, Las Vegas, NV (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/393,027

(22) Filed: Mar. 20, 2003

(65) Prior Publication Data

US 2003/0163292 A1    Aug. 28, 2003

Related U.S. Application Data

(63) Continuation of application No. 09/910,989, filed on Jul. 23, 2001, now abandoned.

(60) Provisional application No. 60/366,581, filed on Mar. 22, 2002.

(51) Int. Cl.
*G06F 17/60* (2006.01)
*B65B 3/02* (2006.01)

(52) U.S. Cl. .............................. 703/1; 53/452; 53/472; 53/504

(58) Field of Classification Search ................. 703/1; 53/452, 472, 504; 700/183, 173, 118, 131, 700/134, 184, 182
See application file for complete search history.

(56) References Cited

U.S. PATENT DOCUMENTS

| | | | |
|---|---|---|---|
| 5,195,041 A * | 3/1993 | George et al. ............... 700/100 |
| 5,458,825 A * | 10/1995 | Grolman et al. ............. 264/401 |
| 5,656,799 A | 8/1997 | Ramsden et al. .............. 177/2 |
| 5,694,344 A * | 12/1997 | Yip et al. ........................ 703/2 |
| 6,189,330 B1 * | 2/2001 | Retallick et al. .............. 62/371 |
| 6,689,035 B1 * | 2/2004 | Gerber ........................ 493/320 |
| 6,721,762 B1 | 4/2004 | Levine et al. ............ 707/104.1 |
| 6,738,507 B1 * | 5/2004 | Liasi et al. .................. 382/152 |
| 6,788,984 B1 * | 9/2004 | Plotkin ......................... 700/97 |
| 2001/0017023 A1 | 8/2001 | Armington et al. ........... 53/472 |

OTHER PUBLICATIONS

Swip et al., "Application of an Integrated Modeling Tool: United Parcel Service" 1991 Winter Simulation Conference p. 786-791.*
Ehrlich-J. "Making Better Manufacturing Decisions with AIM" 1997 Winter Simulation Conference p. 552-558.*

* cited by examiner

*Primary Examiner*—Paul L. Rodriguez
*Assistant Examiner*—Tom Stevens
(74) *Attorney, Agent, or Firm*—Scott A. McBain

(57) ABSTRACT

A simulation program that determines a packaging configuration for placement of any math-based part/assembly into a selected shipping container(s) for transfer of the product to customer plants. The simulation program determines either automatically or manually an efficient packaging configuration for placement of any part/assembly into any appropriate shipping container.

23 Claims, 23 Drawing Sheets

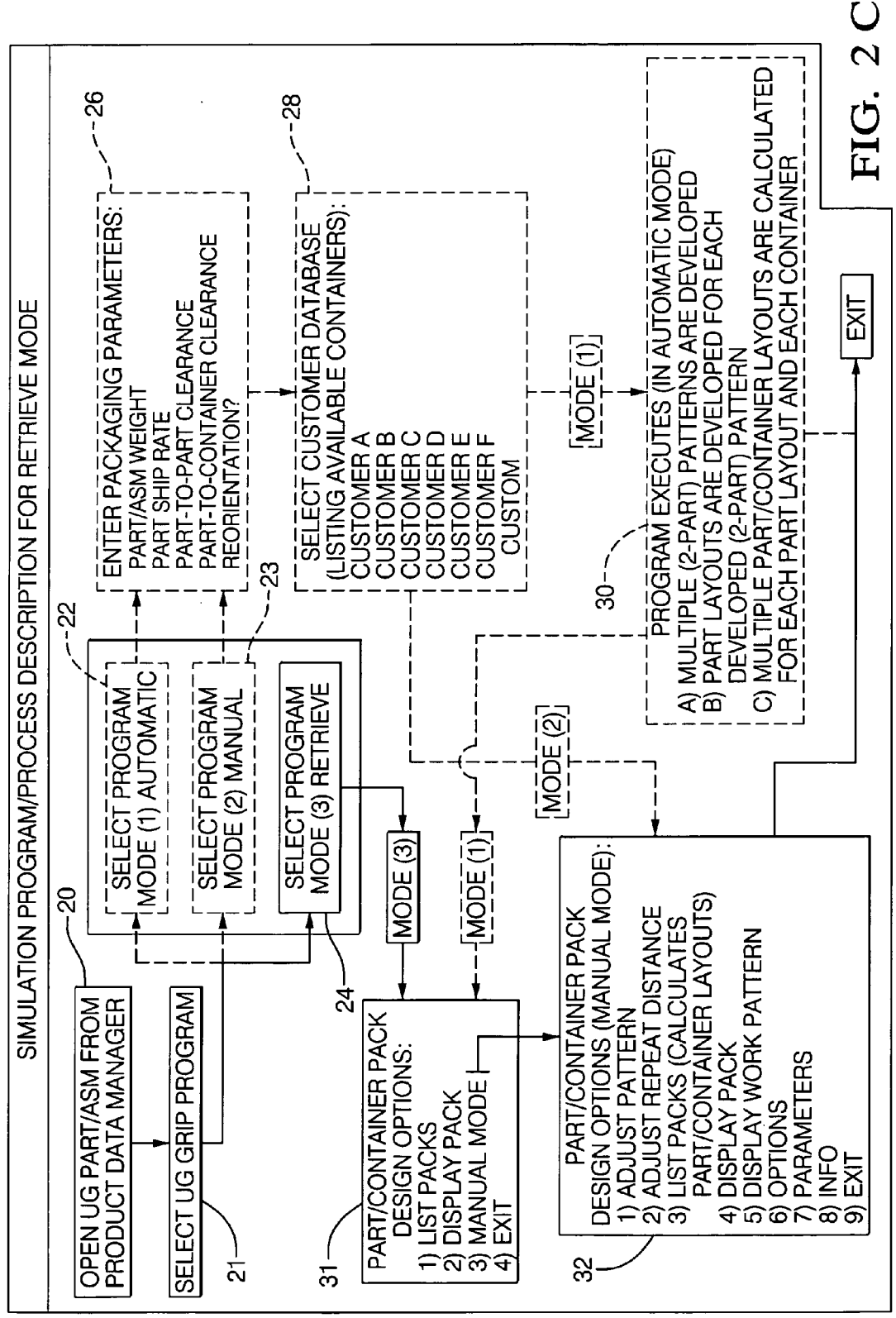

US 7,085,687 B2

METHOD AND APPARATUS FOR MANUFACTURING PACKAGING OPTIMIZATION

CROSS REFERENCE TO RELATED APPLICATIONS:

This application is a continuation of commonly owned and assigned U.S. patent application Ser. No. 09/910,989, filed Jul. 23, 2001 now abandoned, entitled: METHOD AND APPARATUS FOR MANUFACTURING PACKAGING OPTIMIZATION, now abandoned which also claims the benefit of Provisional Application 60/366,581, filed March 22.

TECHNICAL FIELD

This application relates to a method and apparatus for determining and providing a user with a packaging configuration based upon a user provided input.

BACKGROUND

Currently, production-part packaging configurations are manually determined using "best guess" method and manual alignment of physical parts/assemblies by industrial and packaging engineering group members. This process is labor-intensive and generally is only applicable on a part-by-part basis thus the process must be repeated for each unique part/assembly.

SUMMARY

A simulation program that determines optimum and efficient packaging configurations for placement of any math-based part/assembly into its appropriate shipping container(s) for transfer of the product to customer plants.

A simulation program that determines either automatically or manually an efficient packaging configuration for placement of any part/assembly into any appropriate shipping container.

The simulation program also allows the user to modify the output in order to select containers based upon other criteria including but not limited to the following: customer preference, size, weight, amount of containers per eight hour shift and other manufacturing requirements.

The above-described and other features and advantages of the present invention will be appreciated and understood by those skilled in the art from the following detailed description, drawings, and appended claims.

BRIEF DESCRIPTION OF THE DRAWINGS

FIG. 2C is a diagrammatic illustration of portions of a retrieval mode portion of the control algorithm for the packaging optimization method of the present application;

DESCRIPTION OF THE PREFERRED EMBODIMENT

Figure 1:
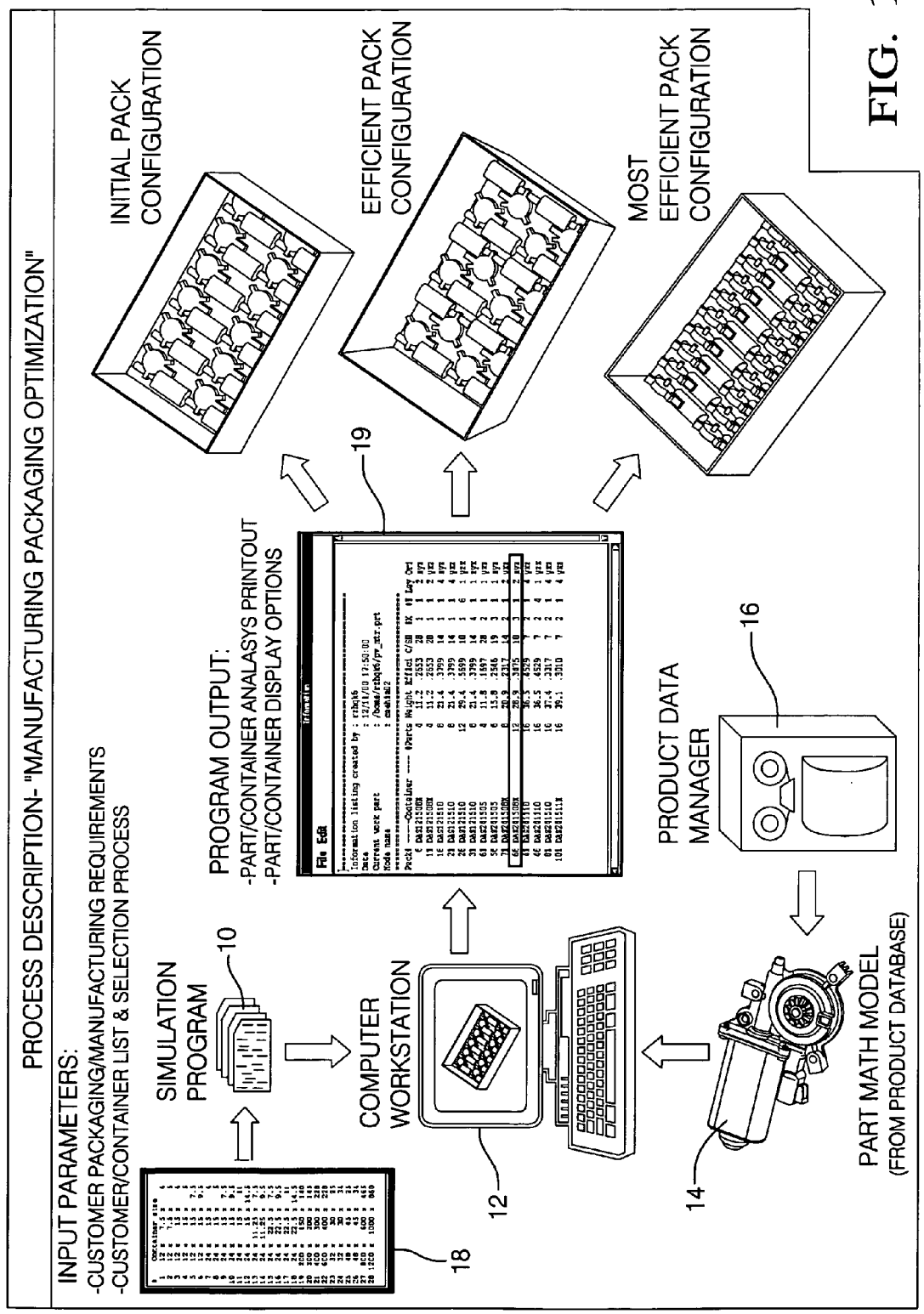
FIG. 1 is a schematic illustration of the packaging optimization process of the present application.

Referring now to FIG. 1, the method for optimizing a packaging configuration for an item to be shipped is illustrated generally. In exemplary embodiment of the present invention, an executable simulation program 10 is run from a computer workstation 12. In response to a request for an input of the item to be used in the simulation, the program runs in either a manual, automatic or retrieval mode.

The item inputted is a computer aided design (CAD) model representation 14 of the physical part/assembly to be shipped. This computer model is selected from a product database 16. For example, model 14 can be a CAD representation of an automotive part such as a window regulator motor.

The simulation arranges model 14 (primary) with a duplicate model (secondary) in a variety of configurations for both the primary and the secondary. Here, these two configured parts serve as the unit of measure for the development of part/container layouts. These unit patterns are oriented into six unique pattern orientations, which are considered for each packaging container. These six orientations relate to movement of the configured patterns about the x, y and z axis. Each of these pattern orientations is considered for each packaging container available from a container database 18. Accordingly, program 10 analyzes many arrangements of the model and numerous configurations for comparison to multiple containers in order to provide the most efficient configuration.

Upon completion of the simulation the most efficient packaging configuration is determined with reference to the container size, the number of parts incorporated into the container, the overall weight of the container and efficiency of the pack configuration.

Figure 2:
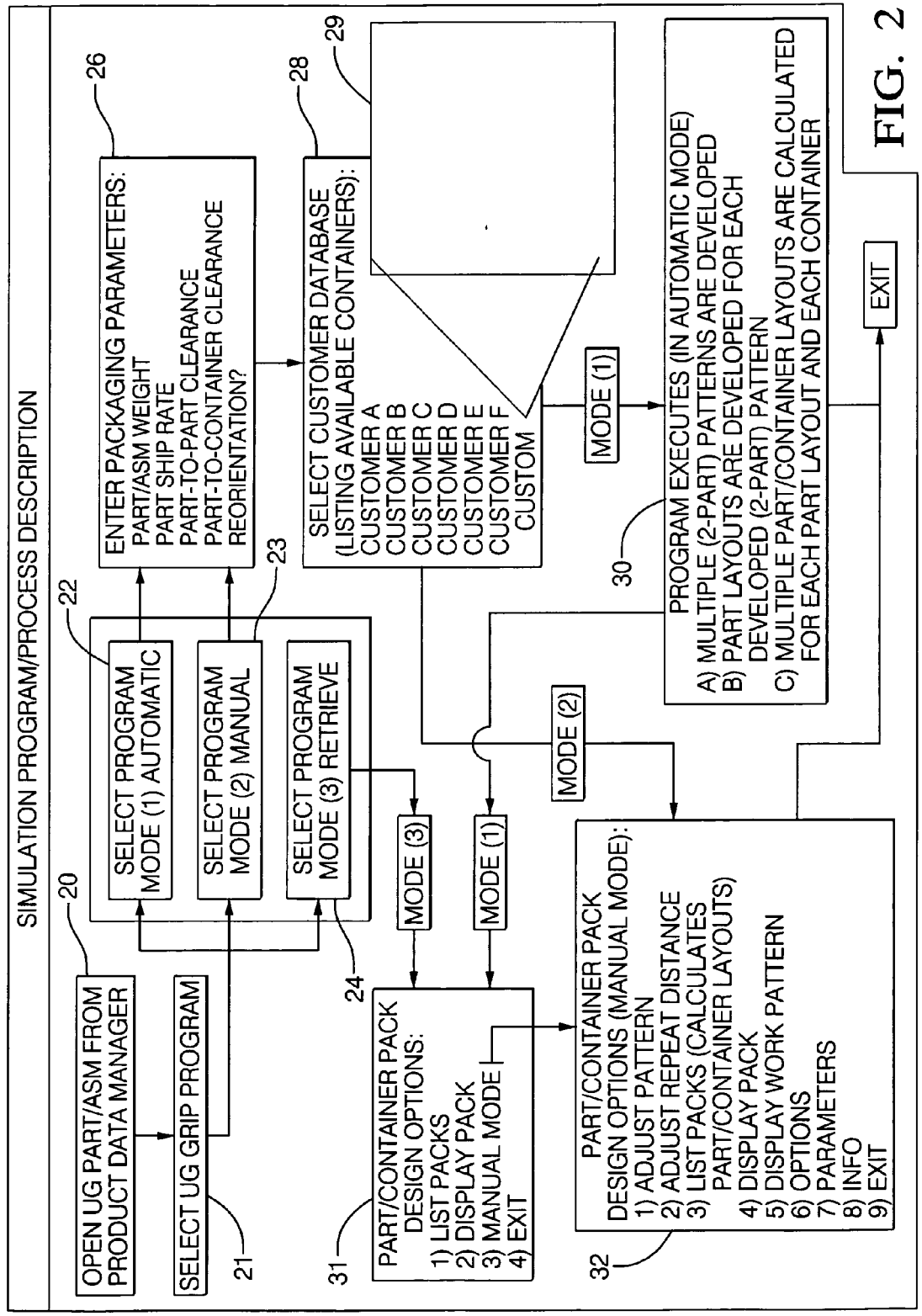
FIG. 2 is a diagrammatic illustration of portions of a control algorithm for the packaging optimization method of the present application.

Referring now to FIG. 2. the operation of program 10 is illustrated schematically. The program user executes step 20 to open the file for a CAD model 14 from the product database 16. The program user selects the packaging simulation program 21 from a database 16.

Figure 2A:
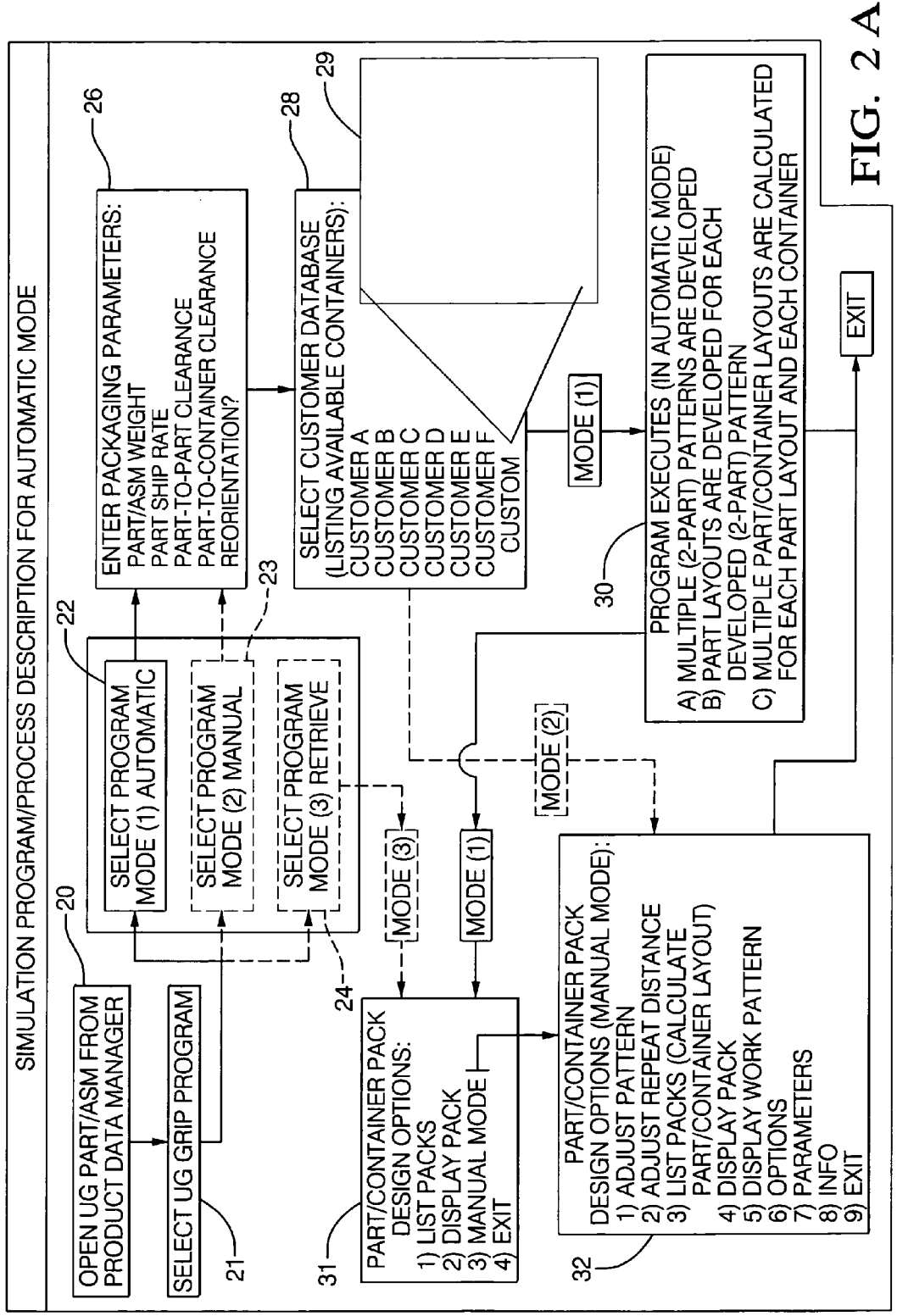
FIG. 2A is a diagrammatic illustration of portions of an automatic mode portion of the control algorithm for the packaging optimization method of the present application.
Figure 2B:
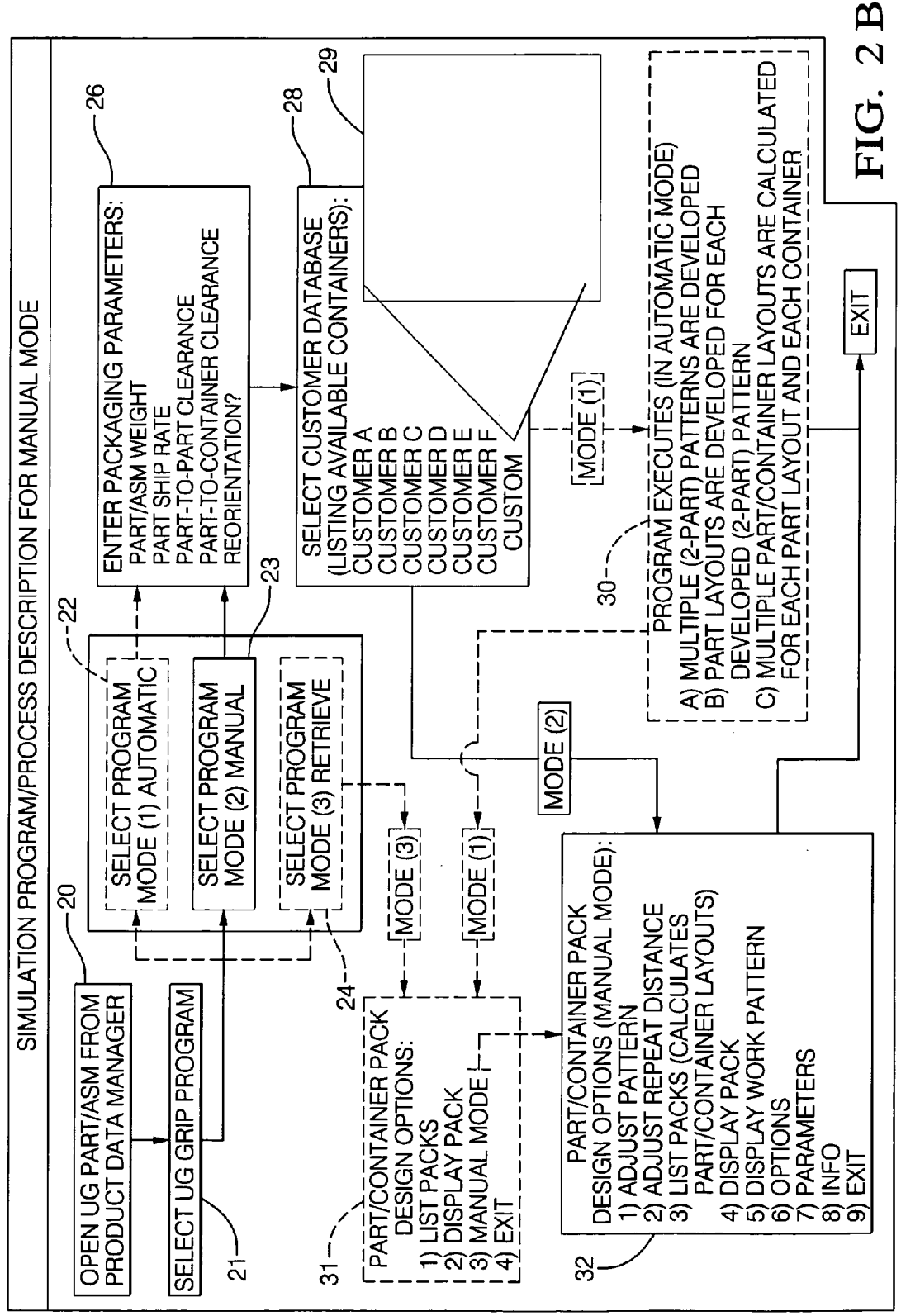
FIG. 2B is a diagrammatic illustration of portions of a manual mode portion of the control algorithm for the packaging optimization method of the present application.

The simulation program prompts the user to select the packaging mode option to be used by the program, either step 22, 23 or 24. In this embodiment there are three options; step 22 is the option for the automatic mode (FIG. 2A), step 23 is the option for the manual mode (FIG. 2B), and step 24 is the option for the retrieval mode (FIG. 2C).

A saved pack layout is opened from a database 16 with the selection of the retrieval mode 24. And the packaging simulation program 21 advances to step 31, where the program user can interact with the saved data through display and printout options.

The simulation program will run faster with a simplified CAD part model, (i.e., a simplified CAD model representation of the original CAD model), than say that of the actual CAD part model that is available from the product database. Therefore, pack layouts can be created (and saved) using the simplified CAD part model. And these pack-layouts are then retrieved after the original CAD part model has been opened, with the intent of "fine-tuning" the two-part pattern. This allows for improved pack-layout efficiencies when using the Manual mode of the simulation program.

If either the manual or automatic mode is selected, the simulation program advances to step 26. The program user is then prompted to enter packaging parameters, which include but are not limited to the following items; part weight, part ship rate, part to part clearance, part to container clearance, and part orientation options (or limitations).

Once the packaging parameters are inputted at step 26, the simulation program advances to step 28. And the program user is prompted to select a customer container database that includes the listing of available containers for multiple customers. Each customer container database in 28 has the listing of available containers and the selection criteria (if applicable) for choosing the appropriate container. With selecting the 'CUSTOM' option in step 28, the program user can create a new container database in step 29. The 'CUSTOM' option 29 includes: creating a unique list of containers by selecting any number of customer databases and/or by individually defining container sizes; saving and retrieving the newly created container list; and display options for listing and clearing the container list.

If the manual mode is selected in step 23 (FIG. 2), then step 32 provides the program user with a plurality of part/container pack design options. These options include but are not limited to the following; adjustment of the pattern, adjustment of the repeat distance, lists packs, display packs, displays of the work pattern, available options, parameters, information and of course an exit prompt. All of these options in step 32 are interactive and can be continuously selected until the exit option is selected. Additionally, the options of steps 32 are presented to the program user in the recommended order of usage. Although these options are in the order of recommended usage the order of their usage may vary.

Figure 3:
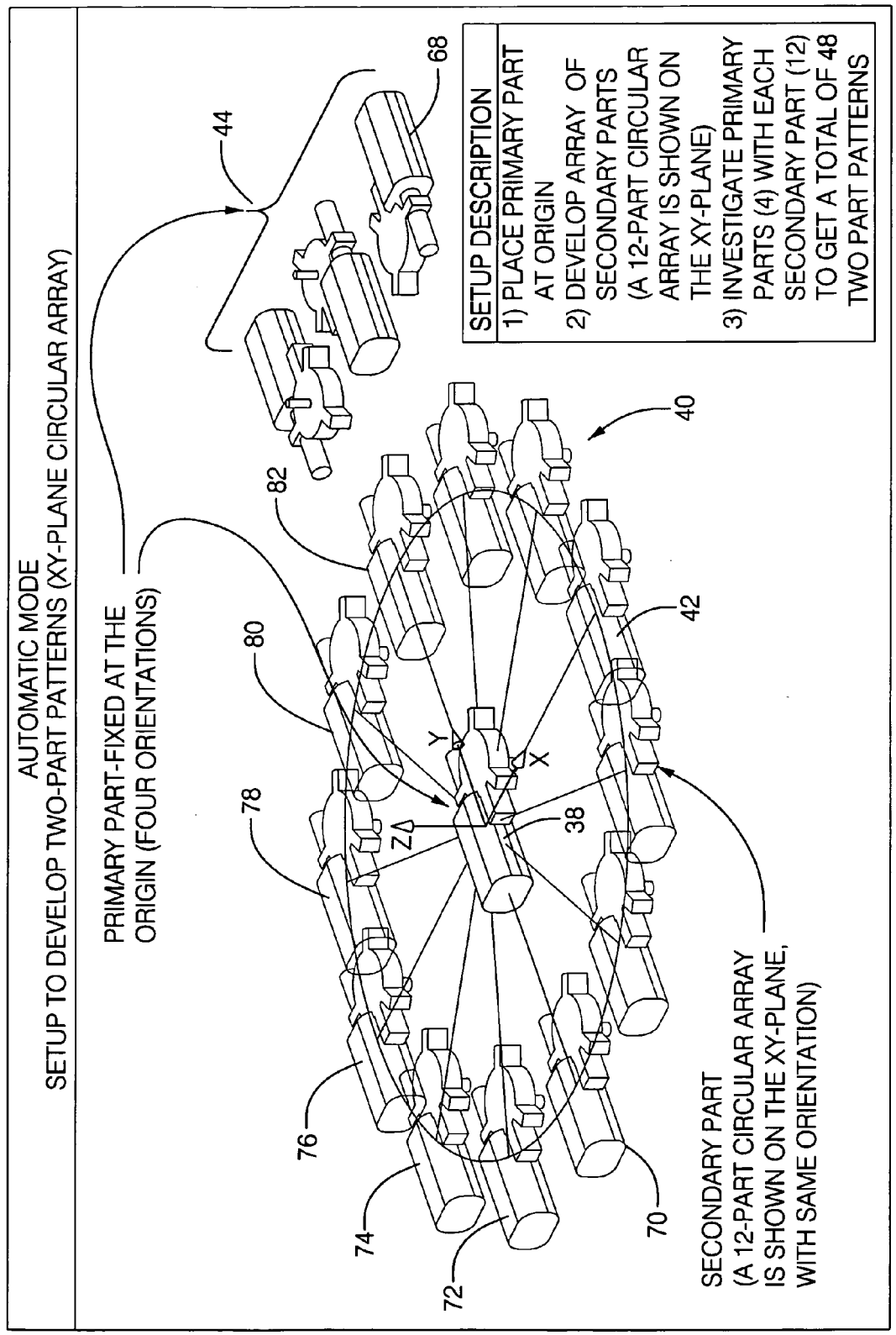
FIGS. 3–7 illustrate an automatic mode of the packaging optimization method illustrated in FIG. 2.

Referring now to FIGS. 3–7, portions of the simulation run by the automatic mode, which can be selected in step 22, are illustrated. FIGS. 3–7 illustrate just one example of a simulation run with a particular model 38. Referring in particular to FIG. 3, the development of a two-part pattern about the xy plane is illustrated. Here, a primary part 38 is fixed at the origin of a principal plane 40. Primary part 38 corresponds to the CAD model selected in step 20 of FIG. 2. In this Figure principal plane 40 is configured about the xy axis. During execution of the simulation program, primary part 38 is compared with a plurality of secondary part locations 42; and are arranged in an array about primary part 38 in principal plane 40 (FIG. 3).

For purposes of illustration, twelve positions of secondary part 42 are arranged in an array about primary part 38. It is, of course, contemplated that more or less locations of the secondary part 42 may be arranged in an array about primary part 38. However, for purposes of this illustration twelve positions are used.

In addition, four unique orientations of the primary part are also investigated with each of the secondary part locations. Three primary part orientations are illustrated by bracket 44. The fourth configuration being the primary part 38 orientation that is currently being investigated by the simulation program and is illustrated at the origin of principal plane 40.

Accordingly, FIG. 3 illustrates that 48 two-part pattern configurations in the xy plane are available for comparison by the simulation program.

Figure 4:
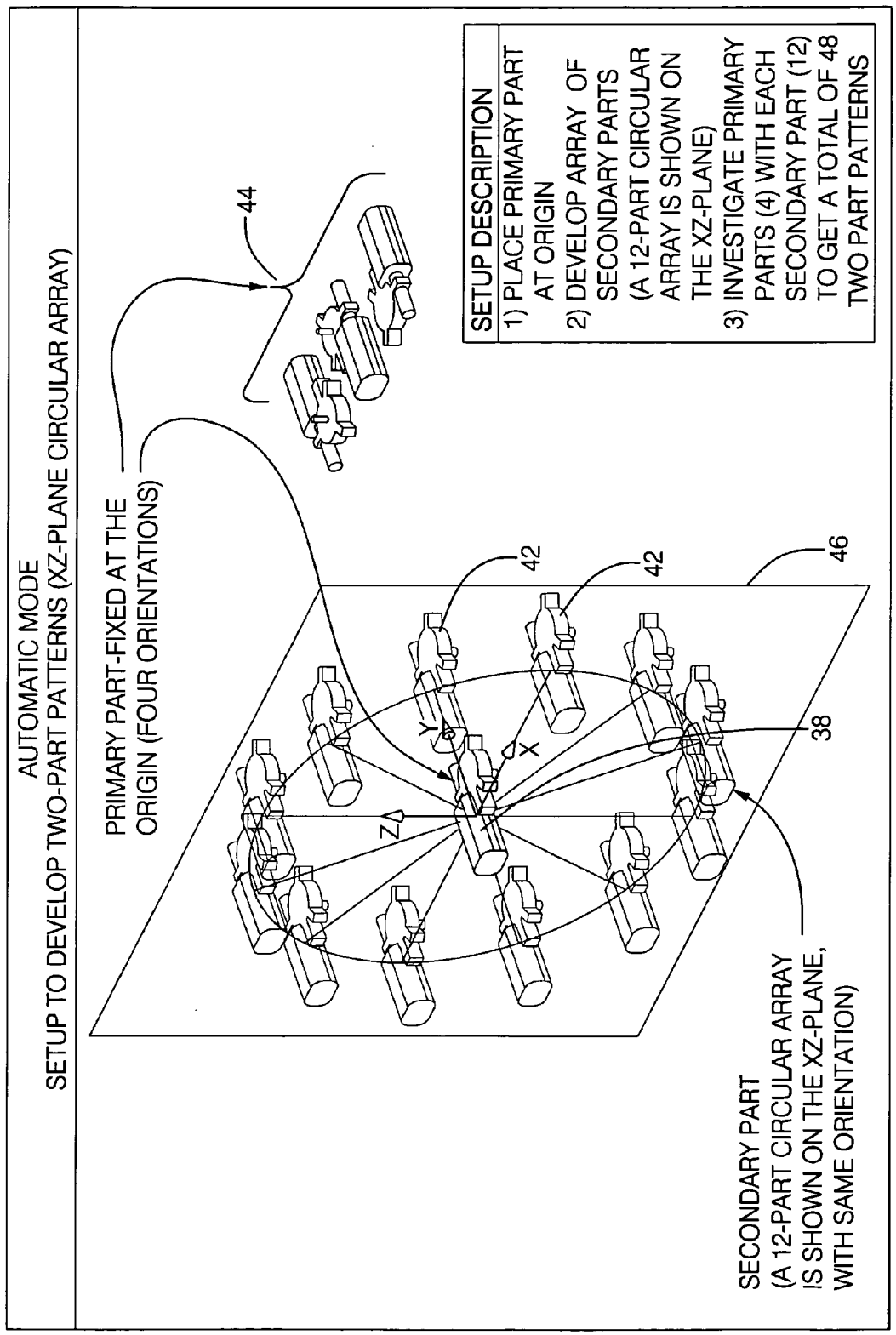

Referring now to FIG. 4, the analysis of a two-part pattern for the same CAD model selected in step 20 is illustrated about the xz plane. Here, a primary part 38 is fixed at the origin of a principal plane 46. In this Figure principal plane 46 is configured about the xz axis. Similar to the comparison of FIG. 3, and during execution of the simulation program, primary part 38 is compared with a plurality of secondary parts 42 which are arranged in an array about principal plane 40 (FIG. 3).

In addition, four unique orientations of the primary part are also investigated with each of the secondary part locations. Three primary part orientations are illustrated by bracket 44. The fourth configuration being the primary part 38 orientation that is currently being investigated by the simulation program and is illustrated at the origin of principal plane 46. Accordingly, FIG. 4 illustrates that 48 two-part pattern configurations in the xz plane are available for comparison by the simulation program.

Figure 5:
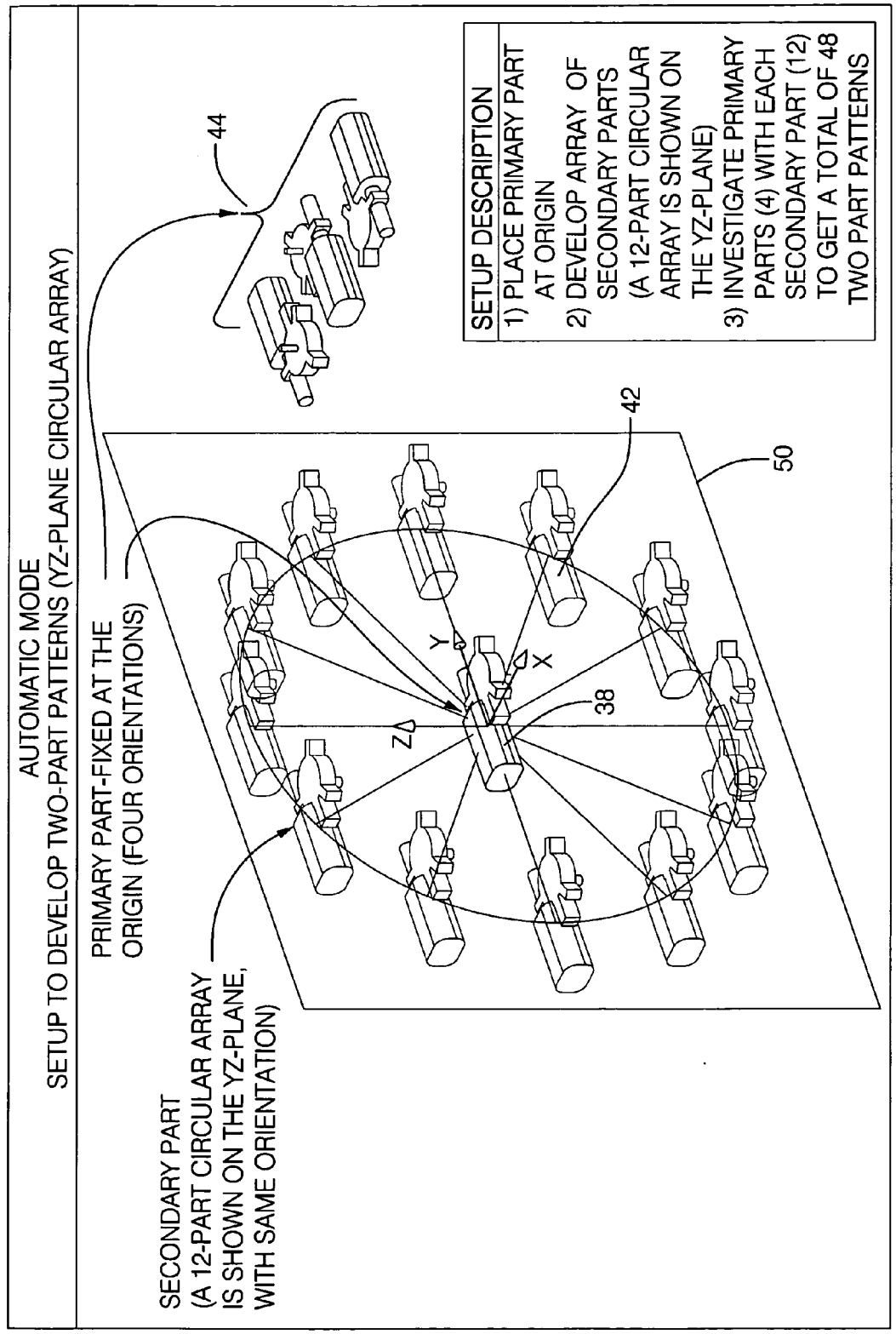

Referring now to FIG. 5, the analysis of a two-part pattern for the same CAD model selected in step 20 is illustrated about the yz plane. Here, a primary part 38 is fixed at the origin of a principal plane 50. In this Figure principal plane 50 is configured about the yz axis. During execution of the simulation program primary part 38 is compared with a plurality of the secondary parts 42 which are arranged in an array about principal plane 50 (FIG. 5).

In addition, four unique orientations of the primary part are also investigated with each of the secondary part locations. Three primary part orientations are illustrated by bracket 44. The fourth configuration being the primary part 38 orientation that is currently being investigated by the simulation program and is illustrated at the origin of principal plane 50. Accordingly, FIG. 5 illustrates that 48 two-part pattern configurations in the yz plane are available for comparison by the simulation program.

Figure 6:
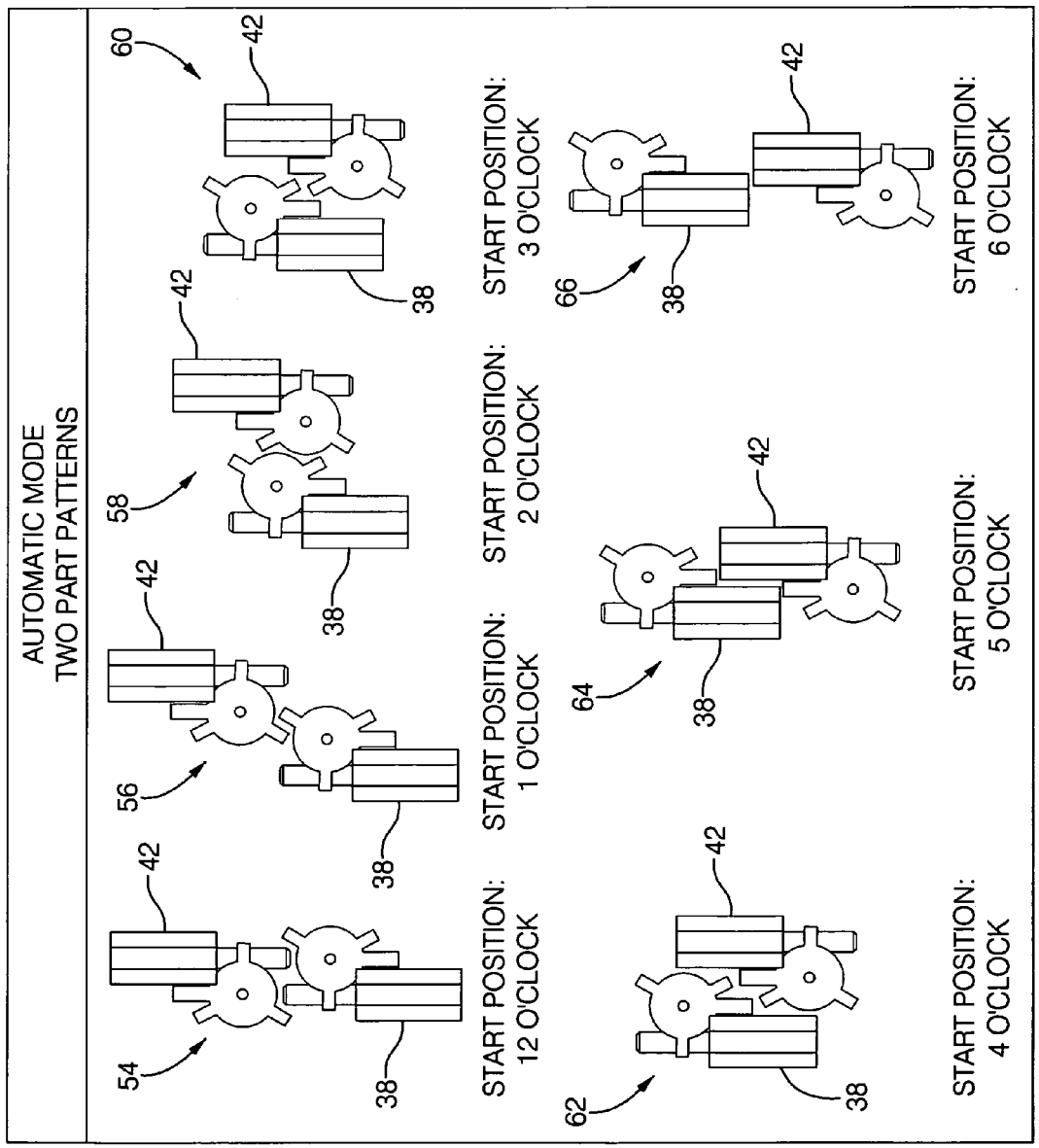

FIG. 6 illustrates several (54, 56, 58, 60, 62, 64 and 66) of many two-part pattern configurations between primary part 38 and secondary part 42 which are utilized by the packaging optimization simulation system. For purposes of illustration, and referring now to FIGS. 3 and 6, the two-part configurations illustrated in FIG. 6 represent the configurations of primary part 38 when it has the initial configuration illustrated as 68 in FIG. 3 and it is being configured with secondary part 42 having the configuration illustrated by (70–84) in FIG. 3. The configuration of secondary part 42 with respect to primary part 38, namely configurations (70, 72, 74, 76, 78, 80, and 82) corresponds to the configurations illustrated in FIG. 6 by items (54 and 70), (56 and 72), (58 and 74), (60 and 76), (62 and 78), (64 and 80) and (66 and 82), respectively.

Accordingly, one hundred and twenty, two-part patterns are determined from FIGS. 3–5. This number is based upon a twelve point array of secondary part 42, which as previously mentioned may be modified to include more or less positions, and the factoring out of redundant patterns which may be determined (twenty four in all) from the simulation run in FIGS. 3–5. Of course, and if the number of positions in the array varies this number will also vary.

Figure 7:
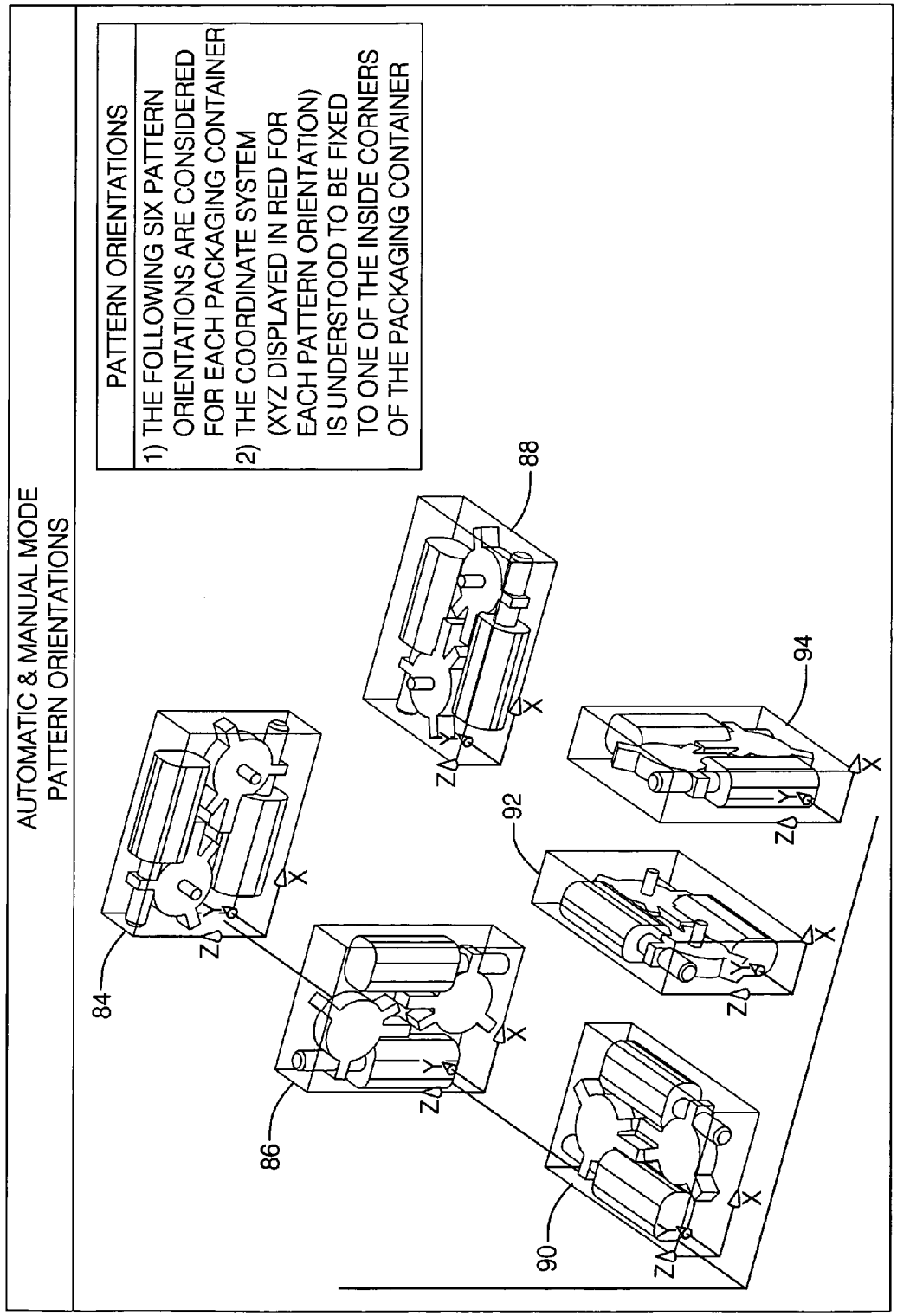

Referring now to FIG. 7, each two-part pattern orientation is considered in six orientations 84, 86, 88, 90, 92 and 94; corresponding to orientations of the two-part patterns about the x, y and z axis. And the coordinate system (x, y and z) is understood to be fixed to one of the inside corners of the packaging container during simulation. Accordingly, each orientation is considered for each packaging container available from the database.

Accordingly, the simulation calculates seven hundred and twenty possible configurations (or part layouts) of the developed two-part patterns. Here, a part layout can be understood to be the unbounded three dimensional array of a two-part pattern. These seven hundred twenty part layouts or configurations are then compared to each of the containers selected from the database in order to generate the part/container layouts. If any of the calculated part/container layouts do not meet the customers' packaging requirements, then these layouts are not considered as a valid (or potential) packaging design and (by default) will not be displayed to the program user as such. All of the valid part/container layouts are organized in a list and presented to the program user as an on-screen display printout (illustrated as box 19, FIG. 1).

Box 30 (FIG. 2) summarizes the execution of the simulation program in the automatic mode. Item (A) in box 30 summarizes the run of the simulation program that develops the one hundred and twenty possible configurations of the two-part pattern described in FIGS. 3–6. Item (B) in box 30 summarizes the run of the simulation program that executes the calculations used to develop the part layouts described in FIGS. 7. Item (C) in box 30 summarizes the run of the simulation program that develops the part/container layouts.

Figure 8:
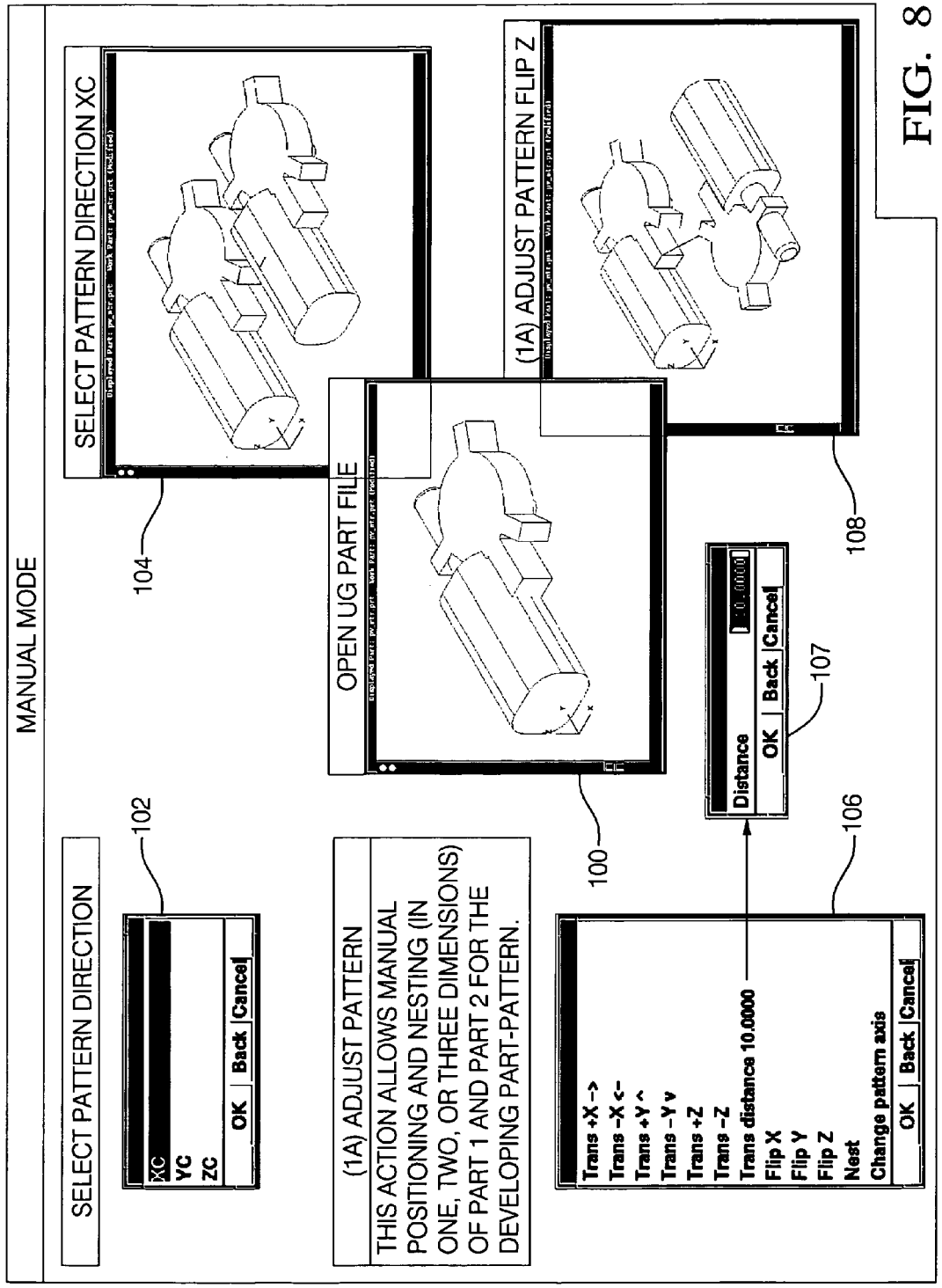
FIGS. 8–9 illustrate a manual mode of the packaging optimization method illustrated in FIG. 2.
Figure 9:
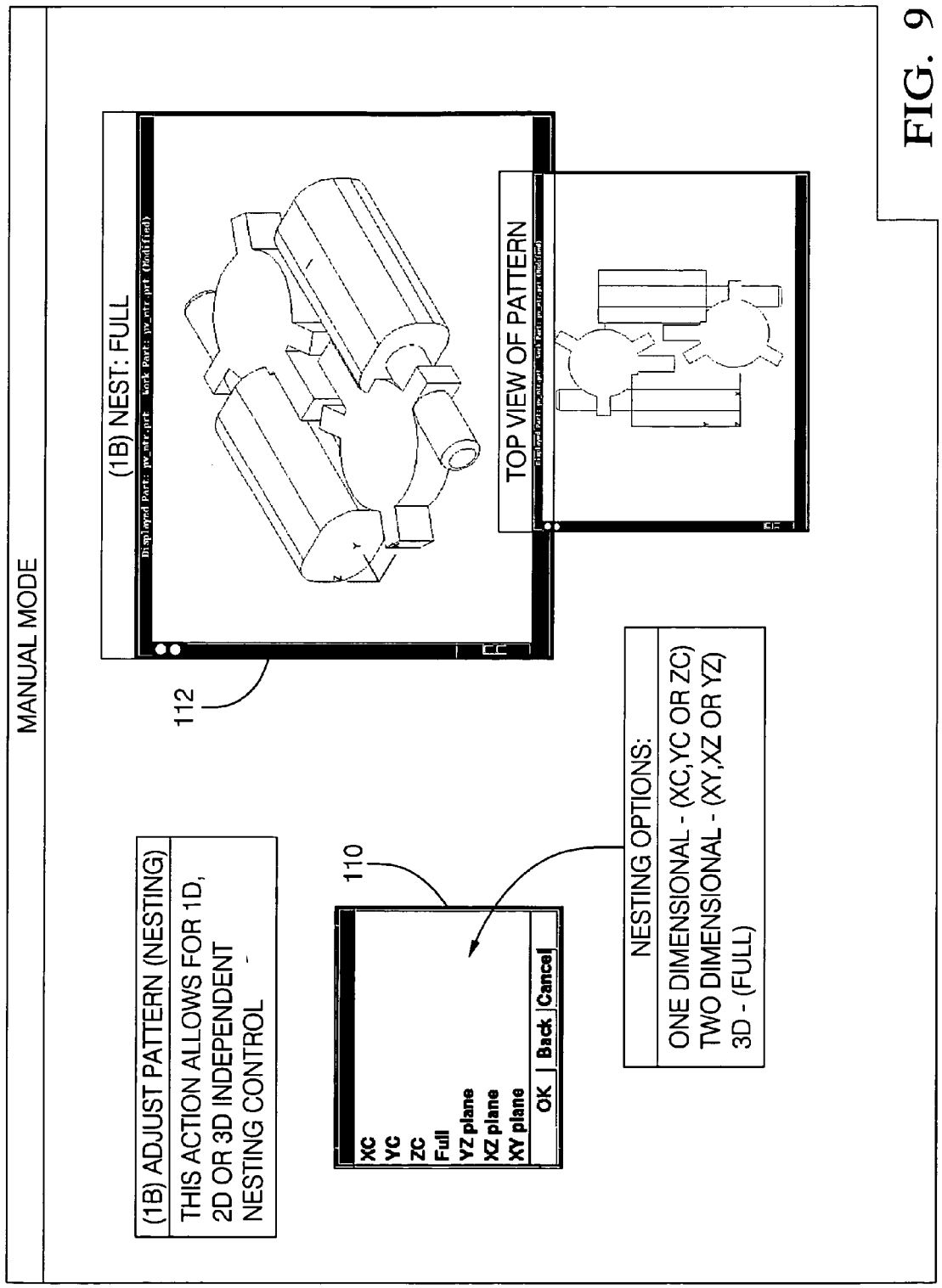
Figure 10:
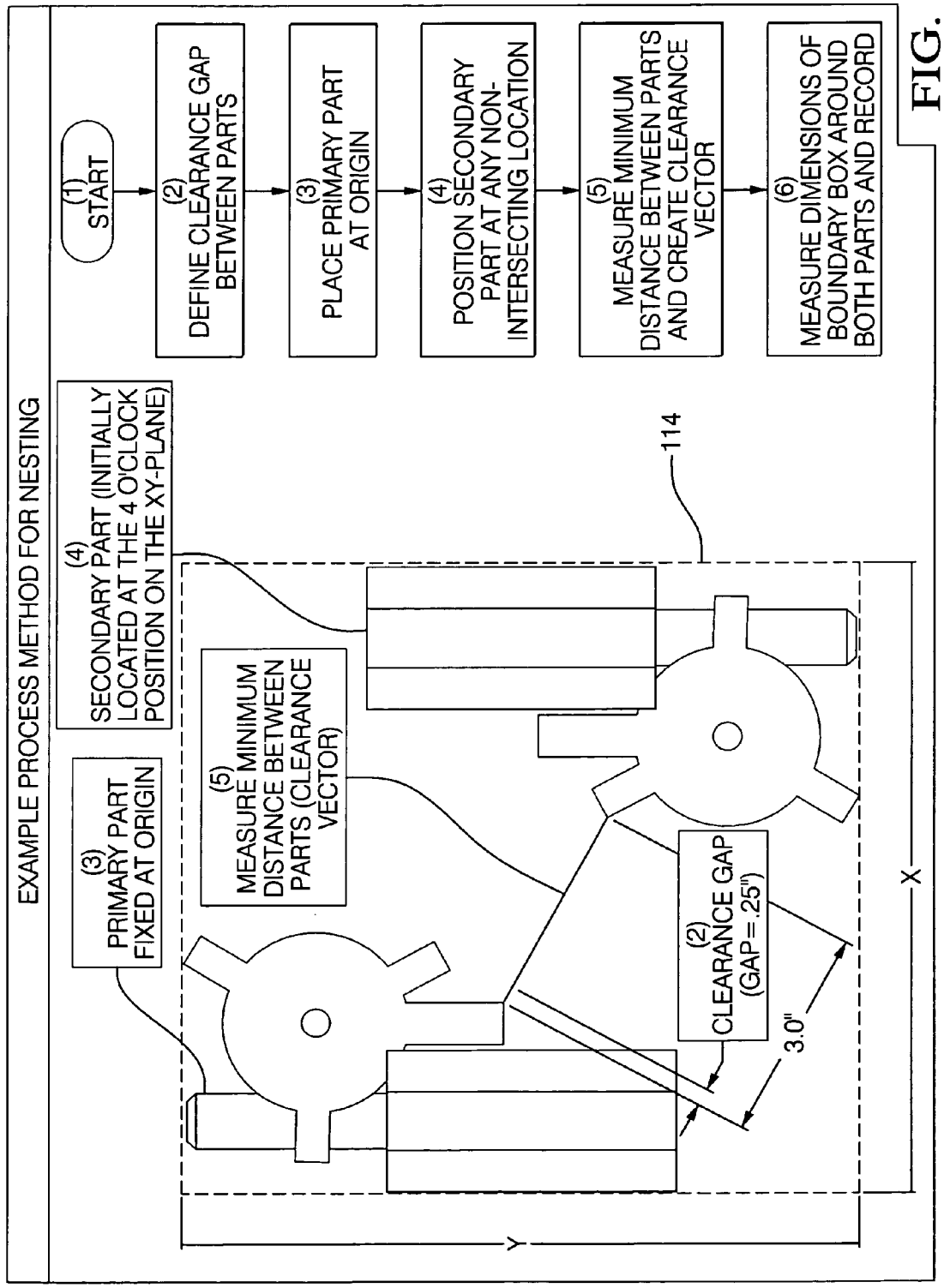
FIGS. 10–15 illustrate a 3D nesting method illustrated in FIG. 2 and FIG. 3.

Referring now to FIGS. 8–10, portions of the manual mode of program 10 are illustrated. The manual mode is selectable from box 23 (FIG. 2). During manual mode the user obtains the CAD part model from the database and is illustrated in box 100 as the primary part. The simulation program prompts the user to develop the pattern by selecting the pattern direction from the options available in the box 102. In an exemplary embodiment, the default pattern direction in box 102 coincides with the smallest dimension of the primary part. Of course, and as an alternative the default direction may vary. In addition, the user may select any pattern direction available in box 102.

Once the pattern direction is selected, the simulation program creates a copy (secondary part) of the primary part and is located in the pattern direction as chosen in box 102. This is illustrated in box 104.

After the pattern direction is selected, the simulation prompts the user with a menu of options, illustrated in box 32 (FIG. 2). The first option listed (recommended) is to adjust the part-pattern and is illustrated in box 106. Adjustment of the part-pattern consists of configuring the secondary part relative to the primary part which is fixed in position. The part-pattern adjustment options illustrated in box 106 consists of the following; 3D translation of the secondary part in the six axial directions, translation distance value setting (illustrated in FIG. 107), re-orienting the secondary part 180 degrees about an axis, change of the pattern direction, and nesting options. For example, box 108 illustrates the 180 degrees flipping of the secondary part along the z-axis.

After accepting the position of the secondary part, selecting the Nest option in box 106 (FIG. 8) allows the program user to select the dimensional control for nesting. This is illustrated in box 110 (FIG. 9). For example, box 110 provides the user with nesting options in either one dimension (along the XC, YC or ZC axis), or two dimensional (in the XY, YZ, or XZ plane), or three-dimensional indicated as full (box 112).

Referring now to FIGS. 10–15, the nesting process method is illustrated two dimensionally for simplicity and understanding. During this process an initial clearance gap (between the primary and secondary part) is provided from the user input for the desired part-to-part clearance (FIG. 2, Box 26); and stored as a calibration constant. The primary part is fixed in location at an origin location and then the secondary part is positioned at any non-intersecting location. The minimum distance between the primary part and the secondary is measured and stored in memory as the clearance vector. In addition, the dimensions (x, y, and z) of a boundary box 114 around both parts is measured and recorded.

Figure 11:
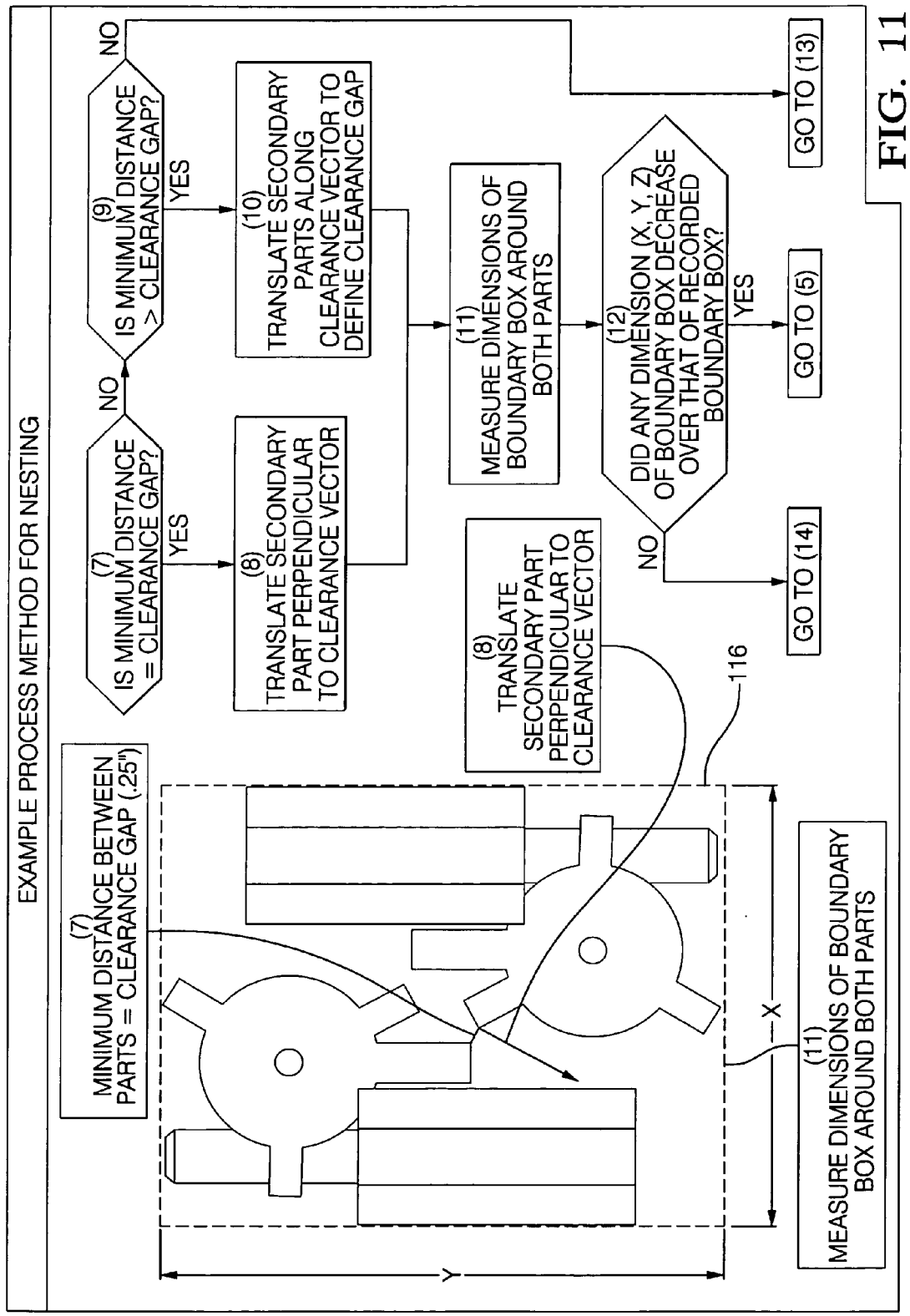
Figure 12:
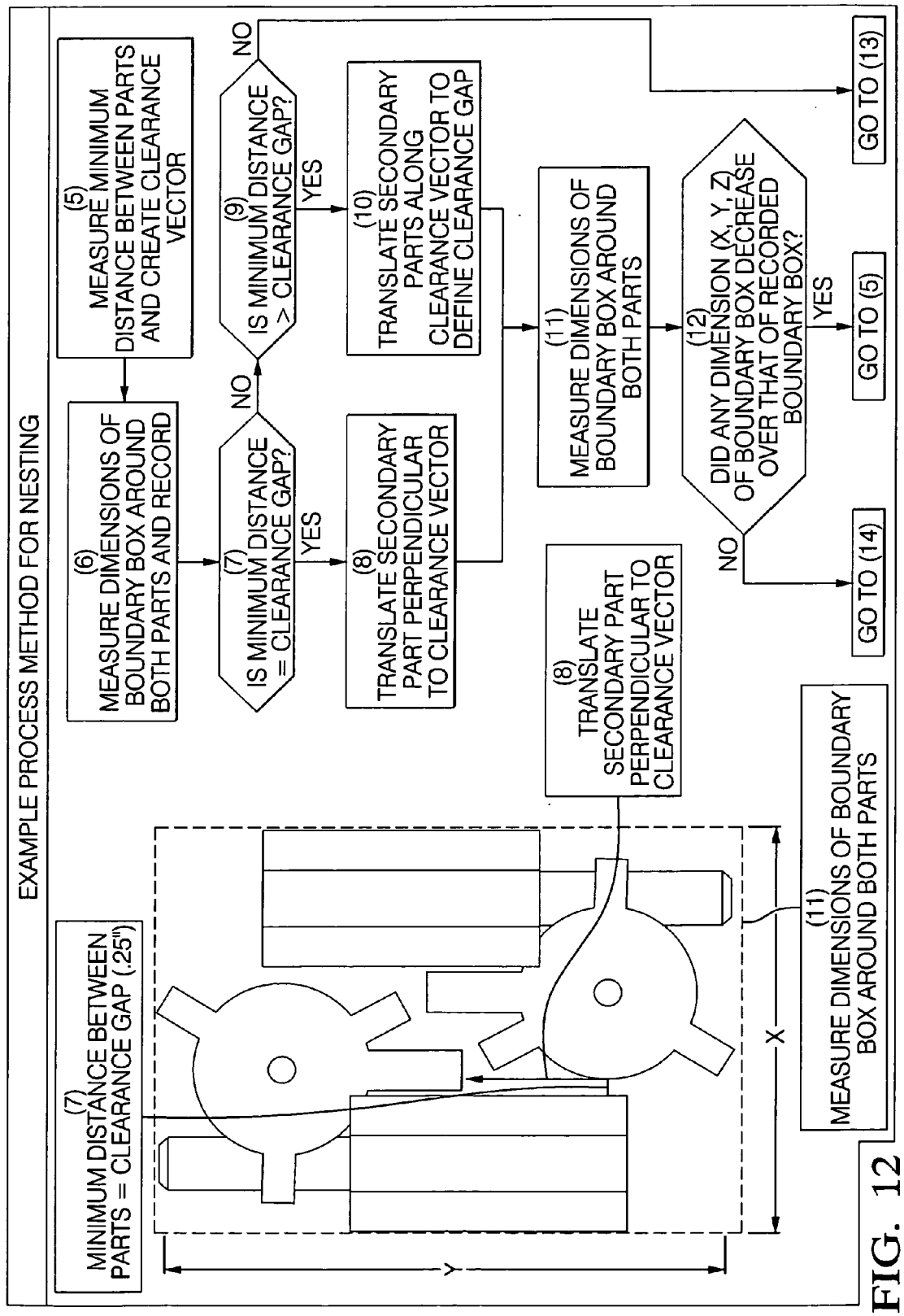
Figure 13:
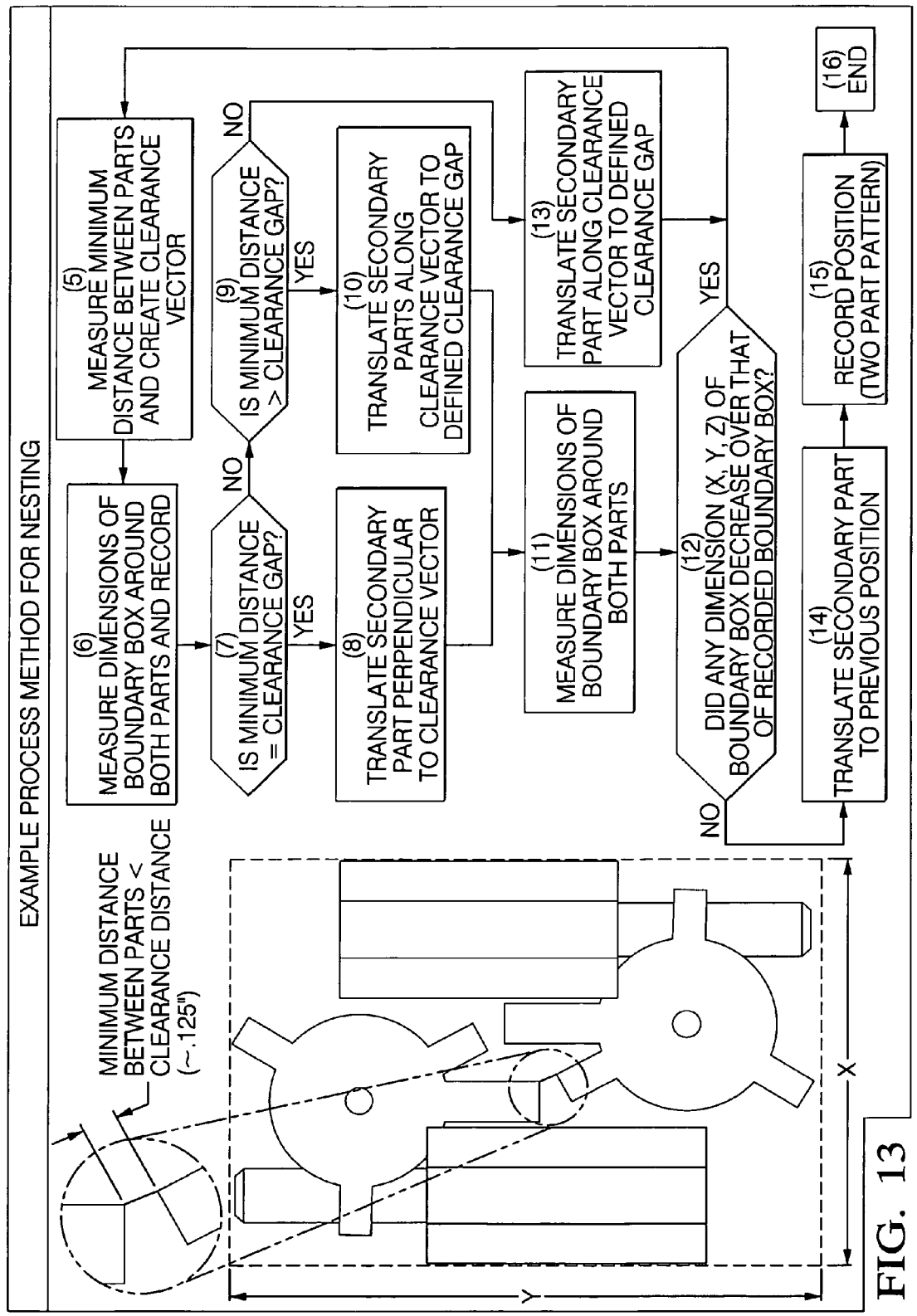
Figure 14:
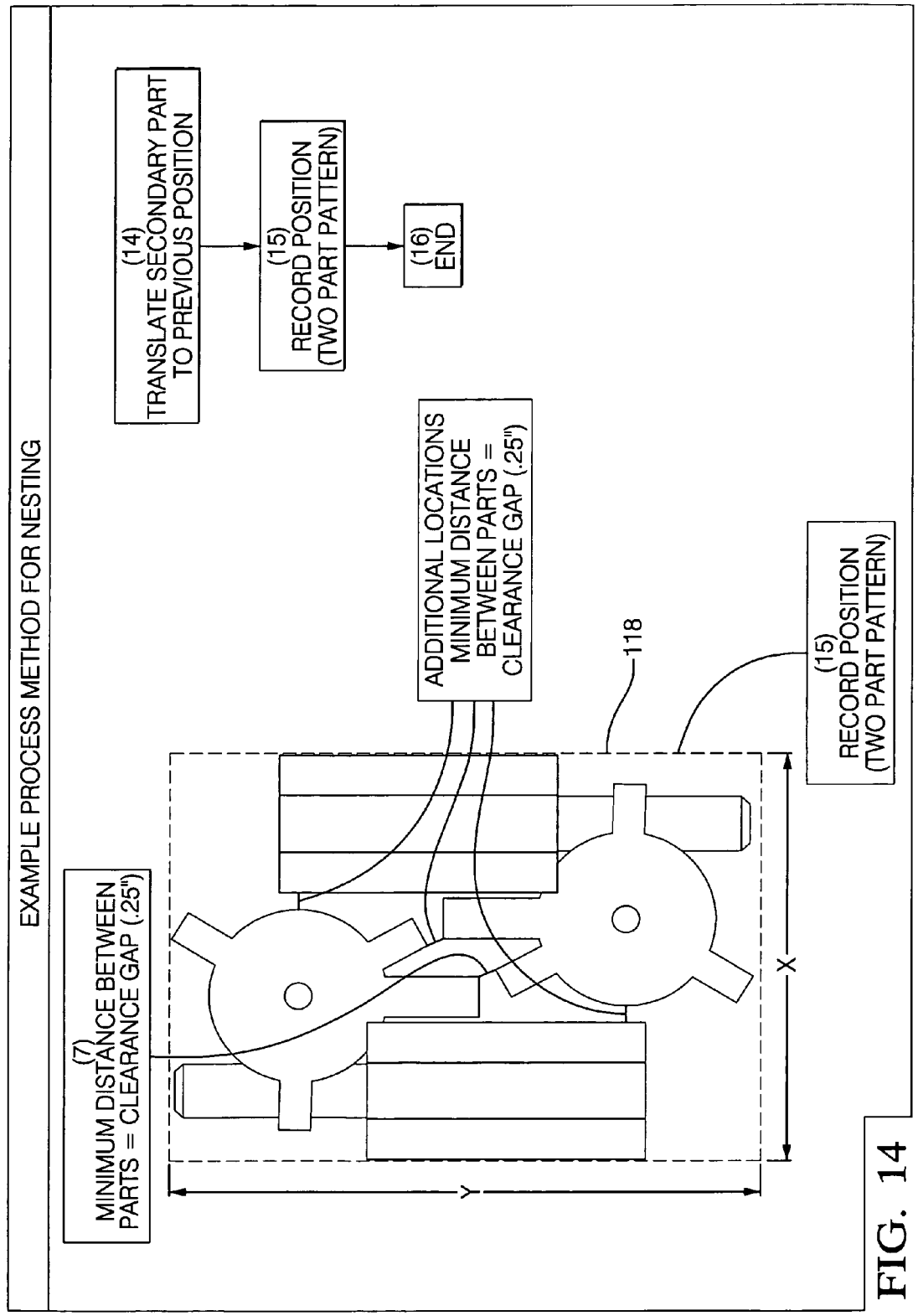

During operation of the nesting process the minimum distance is measured between parts and is compared to the user defined clearance gap. If the minimum distance is greater than the desired part-to-part clearance, then the secondary part is translated along a clearance vector toward the primary part and to the location where the minimum distance between parts is now equal to the clearance gap (FIG. 11, Box 116). And if the dimensions of this new boundary box 116 decreases, the secondary part is translated incrementally and perpendicularly to the clearance vector until the minimum distance between the parts is reached which will provide the smallest possible dimensions of the boundary box 118 (FIG. 14).

Figure 15:
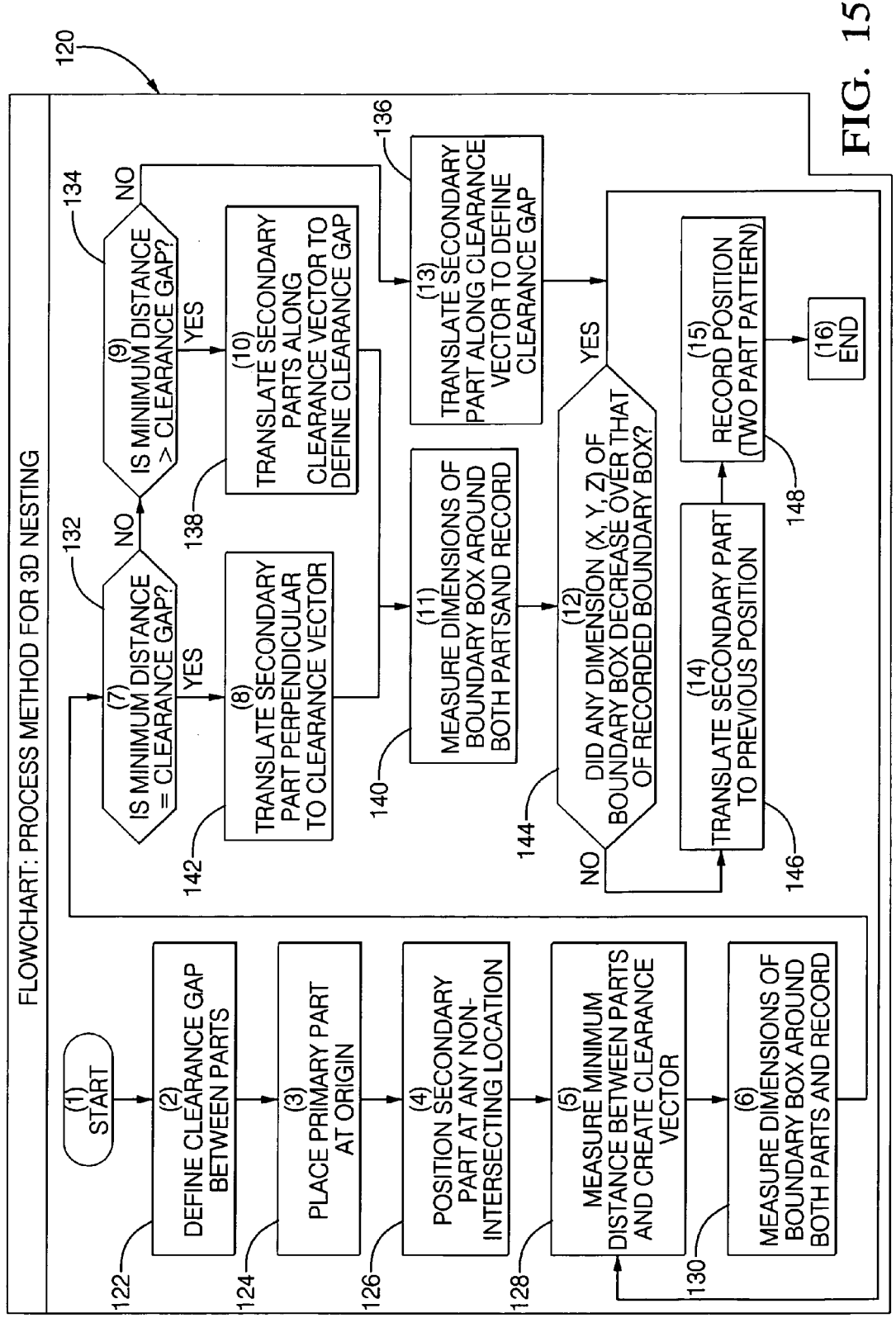

For example, and referring now to FIG. 15 portions of a control algorithm 120 for performing the nesting process method is illustrated. The steps of the control algorithm 120 are also illustrated sequentially in FIGS. 10–14.

Box 122 represents the request for a clearance gap input for the two parts. Box 124 represents the positioning of the primary part at an origin point. Box 126 represents the manual positioning of the secondary part at any non-intersecting location. Box 128 represents the logic for measuring the minimum distance between the parts and the assignment of a value to a variable defined as the clearance vector.

Box 130 represents the measurement of the dimensions of the boundary box defining or enclosing both the secondary and primary parts. This value is stored in memory.

A decision node 132 determines whether the minimum distance is equal to the clearance gap. If not, a decision node 134 determines whether the minimum distance is greater than the clearance gap. If not, then the minimum distance is less than the clearance gap. And with box 136, the secondary part is translated along the clearance vector to the location where the length of the clearance vector is equal to that of the clearance gap. Here, the secondary part moves away from the primary part and in the direction of the clearance vector. And the logic of box 128 is repeated.

If however, the minimum distance measured is greater than the clearance gap, box 138 instructs the secondary part to be moved along the clearance vector in the direction toward the primary part to the location where the length of the clearance vector is equal to that of the clearance gap.

After this process is performed box 140 represents the re-measurement of the boundary box around both parts and the new value is assigned to a new boundary box measurement stored in memory.

Alternatively, and if the minimum distance is equal to the clearance gap, box 142 represents the instruction to translate the secondary part along a line perpendicular to the clearance vector. After this process is performed box 140 represents the re-measurement of the boundary box defined around both parts and this value is assigned to new boundary box measurement stored in memory.

After the commands of box 140 are executed, a decision node 144 determines whether any of the edge dimensions (x, y or z) of the boundary box decreased over the previously recorded dimensions, (i.e., comparison of new measurement vs. previous measurement).

If there was no measured decrease in any of the dimensions of the boundary box, box 146 instructs the secondary part to be translated back to its previous position. Then box 148 stores that positional information of the two-part pattern to be used.

Alternatively, and if any of the dimensions of the boundary box decreased, the logic of box 128 is repeated. This process will continue until the minimum boundary box dimensions are obtained.

Figure 16:
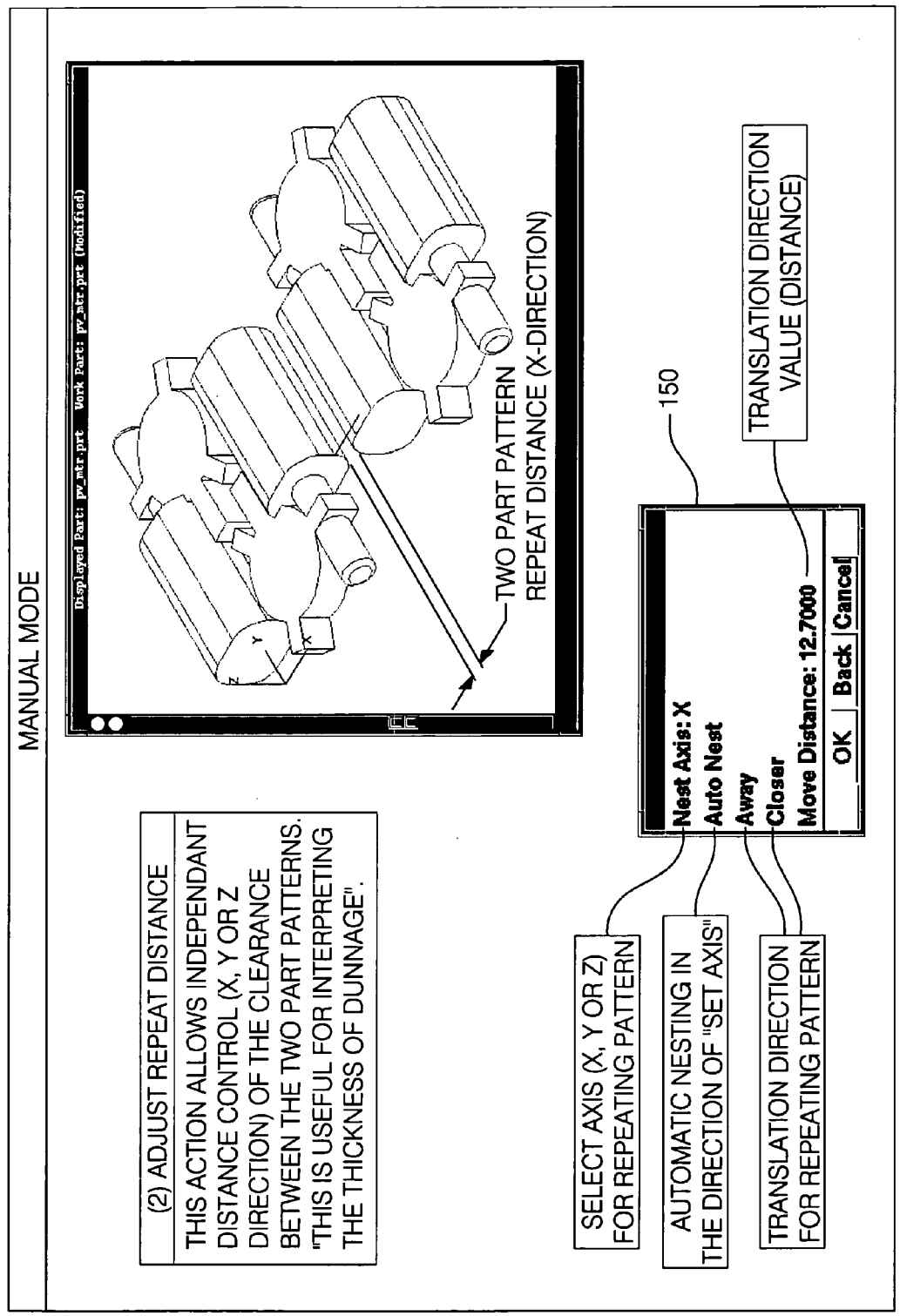
FIGS. 16–20 illustrate options available for the control algorithm.

Referring now to FIG. 16, the option for adjusting the repeat distance of the two-part pattern is illustrated. Here a command prompt 150 provides a user with selections for allowing independent control (x, y and z directions) of the clearance between the two-part patterns. This is particularly useful for interpreting the thickness of dunnage required for packaging the considered part. Command prompt 150 allows the user to manually set the value for the (two-part) pattern repeat distance by translating the repeated (second) two-part pattern either away or closer to the initial two-part pattern. The magnitude for translating the two-part pattern can be set by the user with the 'Move Distance' option. One dimensional nesting (in the direction of 'Set Axis') of the two two-part patterns is available with the 'Auto' option.

Figure 17:
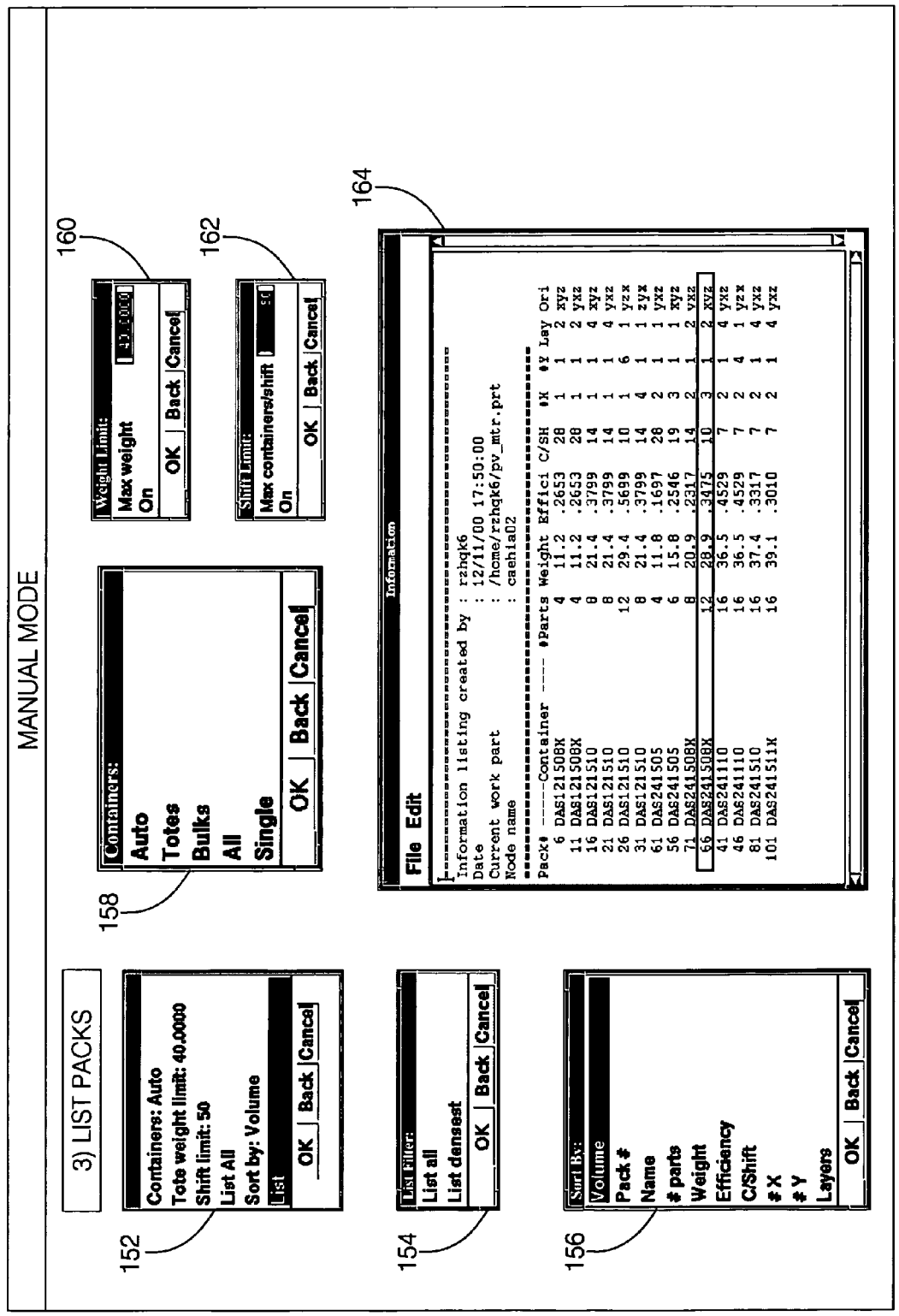

Referring now to FIG. 17, the options for the listing pack command of box 32 (FIG. 2) is illustrated as dialog box or prompt 152. And each option in box 152 has its own menu of options, (i.e., prompts 154, 156, 158, 160 and 162). Box 164 represents the information obtained after the containerization optimization method has been performed. It is noted that here this option is available for all packaging modes, (e.g., automatic, retrieve and manual). Box 164 provides the user with necessary information in order to select the most efficient packaging container. For example, outlined in box 164 a line of text reveals that twelve parts with an overall (packed container) weight of 28.9 pounds and overall efficiency of 0.3475 is obtained from pack No. 66. Prompt 158 allows the user the option to list results by container style, (e.g., Totes, Bulk Packs, All Styles, Single Container and Auto). The 'Auto' container style is the default setting which selects the container style based on the customer's requirements; that is, if a customer database was selected in Box 28 (FIG. 2).

Prompt 160 allows the user to input the maximum weight limit for the container to be used. Prompt 162 allows the user to input a shift limit, (i.e., maximum amount of containers to be shipped during an eight hour work period). Both prompts 160 and 162 have an on/off toggle feature that allows the weight and shift limit control feature to be either considered or ignored by the simulation program. Prompt 154 allows either all the pack results to be listed or to consider only the most efficient results for each unique container size. All of these features allow the user to modify the output for display purposes. Prompt 156 provides data sorting options that allows the user to sort the column data in Box 164, (e.g., container volume, total number of parts per container, containers per shift, efficiency, etc.).

Figure 18:
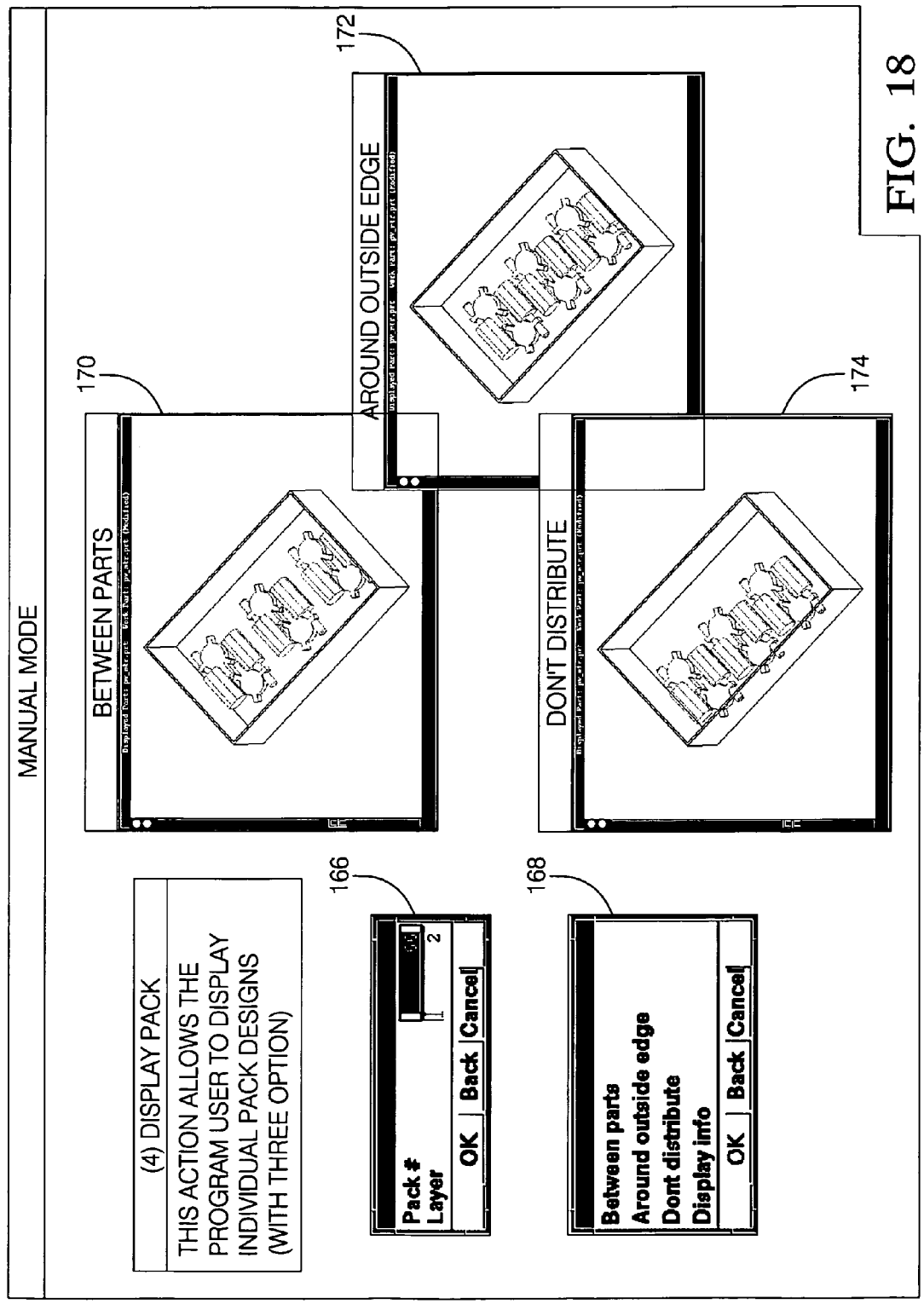

Referring now to FIG. 18, the display pack option of box 32 (FIG. 2) is illustrated by dialog boxes and or command prompts 166, 168 170, 172 and 174. Prompts 166 and 168 provide the user with the selections settings and the options for allowing the program user to display the individual pack designs with three different pack-layout options; namely, between parts, around outside edge and don't distribute identified as information boxes 170, 172 and 174, respectively. It is noted that this option is available for all packaging modes selected, (e.g., automatic, retrieve and manual).

Figure 19:
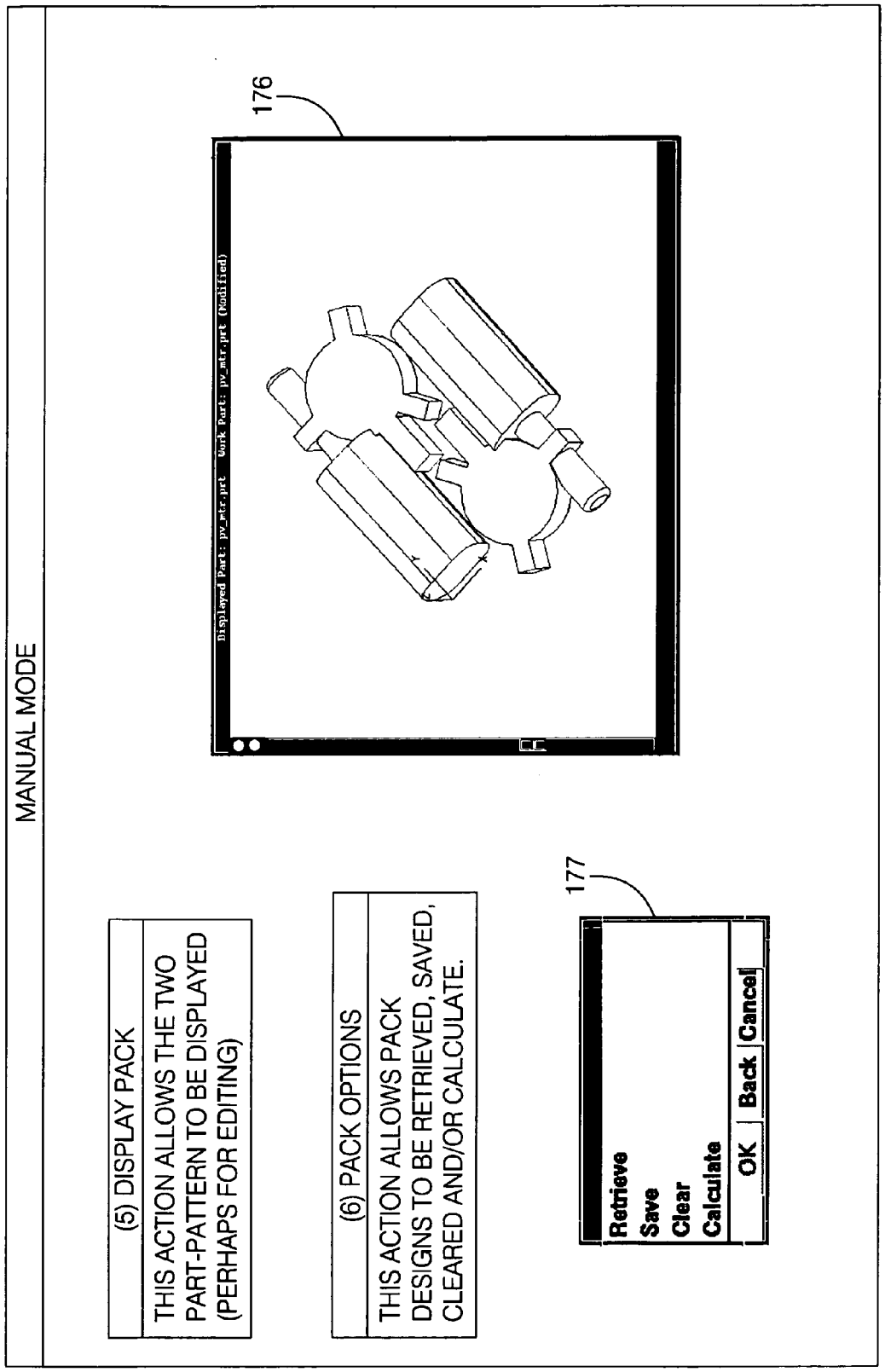

Referring now to FIG. 19, the display work pattern option of box 32 (FIG. 2) is illustrated by box 176. This action allows the part pattern to be displayed. This is useful for editing the two-part pattern. The pack options in box 32 are illustrated by box 177. This action allows the pack-layout design to be saved (for use in retrieval mode), cleared, retrieved and/or calculated. The 'Calculate' option is useful if changes are made to the original two-part pattern, when using the 'Display Work Pattern' option (box 176).

Figure 20:
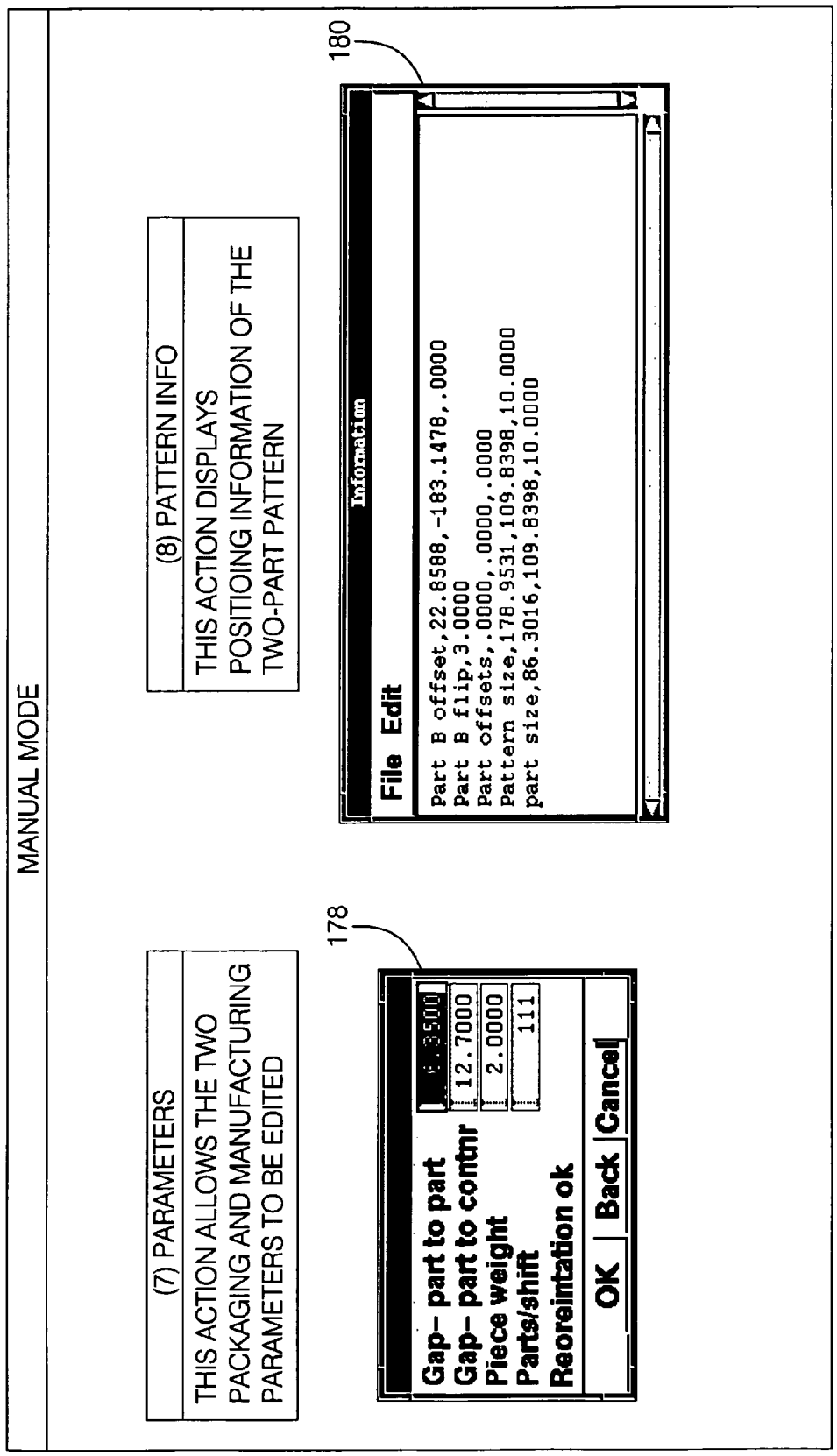

Referring now to FIG. 20, the 'Parameters' display and information option of box 32 (FIG. 2) are illustrated by dialog box 178 and box 180. The parameter option allows the packaging and manufacturing parameters to be edited by the user. The information option displays positioning information regarding the considered two-part pattern.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for determining a part packaging design for a container, comprising:
   selecting a first CAD model of a manufactured part from a part database;
   selecting a first container from a container database, the first container defining a first receiving region;
   automatically generating a first plurality of 3D part packaging designs for the first receiving region, wherein each 3D part packaging design of the first plurality of 3D part packaging designs comprises a distinct orientation or positioning of the first CAD model of the manufactured part and at least a second CAD model, and
   selecting a first 3D part packaging design from the first plurality of 3D part packaging designs, wherein a first volume defined by the first 3D part packaging design is held within the first receiving region.

2. The method as in claim 1, wherein each of the first plurality of 3D part packaging designs comprises a plurality of two part patterns, each two part pattern comprising the first CAD model and the second CAD model wherein the first CAD model in disposed at a predetermined position or orientation relative to the second CAD model.

3. The method as in claim 2, wherein the first CAD model is identical to the second CAD model.

4. The method as in claim 2, further comprising:
   disposing the first CAD model of the manufactured part on a first plane;
   generating a plurality of second CAD models based on the second CAD model, wherein the second CAD model is identical to the first CAD model; and
   disposing the plurality of second CAD models on the first plane in a spatial relationship with the first CAD model, wherein the first CAD model and each second CAD model of the plurality of second CAD models on the first plane comprise a two part pattern of the plurality of two part patterns.

5. The method as in claim 4, further comprising:
   disposing the first CAD model of the manufactured part on a second plane substantially parallel to the first plane; and disposing the plurality of second CAD models on the second plane in a spatial relationship with the first CAD model, wherein the first CAD model and each second CAD model of the plurality of second CAD models on the second plane comprise a two part pattern of the plurality of two part patterns.

6. The method as in claim 5, further comprising:
disposing the first CAD model of the manufactured part on a third plane substantially parallel to the second plane; and
disposing the plurality of second CAD models on the third plane in a spatial relationship with the first CAD model, wherein the first CAD model and each second CAD model of the plurality of second CAD models on the third plane comprise a two part pattern of the plurality of two part patterns.

7. A method for determining a part packaging design for a container comprising:
selecting a first CAD model of a manufactured part from a part database;
selecting a first container from a container database, the first container defining a first receiving region;
inputting at least one part packaging parameter using an input device;
automatically generating a first plurality of 3D part packaging designs for the first receiving region, wherein each 3D part packaging design of the first plurality of 3D part packaging designs comprises a distinct orientation or positioning of the first CAD model of the manufactured part and at least a second CAD model, the first plurality of 3D part packaging designs being generated based on the at least one part packaging parameter, and
selecting a first 3D part packaging design from the first plurality of 3D part packaging designs, wherein a first volume defined by the first 3D part packaging design is held within the first receiving region.

8. The method as in claim 7, wherein each of the first plurality of 3D part packaging designs comprises a plurality of two part patterns, each two part pattern comprising the first CAD model and the second CAD model wherein the first CAD model in disposed at a predetermined position or orientation relative to the second CAD model.

9. The method as in claim 8, wherein the first CAD model is identical to the second CAD model.

10. The method as in claim 7, further comprising:
disposing the first CAD model of the manufactured part on a first plane;
generating a plurality of second CAD models based on the second CAD model, wherein the second CAD model is identical to the first CAD model; and
disposing the plurality of second CAD models on the first plane in a spatial relationship with the first CAD model, wherein the first CAD model and each second CAD model of the plurality of second CAD models on the first plane comprise a two part pattern of the plurality of two part patterns.

11. The method as in claim 10, further comprising:
disposing the first CAD model of the manufactured part on a second plane substantially parallel to the first plane; and
disposing the plurality of second CAD models on the second plane in a spatial relationship with the first CAD model, wherein the first CAD model and each second CAD model of the plurality of second CAD models on the second plane comprise a two part pattern of the plurality of two part patterns.

12. The method as in claim 11, further comprising:
disposing the first CAD model of the manufactured part on a third plane substantially parallel to the second plane; and
disposing the plurality of second CAD models on the third plane in a spatial relationship with the first CAD model; wherein the first CAD model and each second CAD model of the plurality of second CAD models on the third plane comprise a two part pattern of the plurality of two part patterns.

13. The method as in claim 7, wherein the at least one part packaging parameter comprises at least one of a part shipping weight; a part ship rate; a part-to-part clearance; and a part-to-container clearance.

14. A computer readable medium comprising a plurality of instructions, which when executed by a computer, cause the computer to perform the steps of:
querying a user to select a first CAD model of a manufactured part from a part database;
querying a user to select a first container from a container database, the first container defining a first receiving region;
automatically generating a first plurality of 3D part packaging designs for the first receiving region, wherein each 3D part packaging design of the first plurality of 3D part packaging designs comprises a distinct orientation or positioning of the first CAD model of the manufactured part and at least a second CAD model, and
selecting a first 3D part packaging design from the first plurality of 3D part packaging designs, wherein a first volume defined by the first 3D part packaging design is held within the first receiving region.

15. The method as in claim 2, further comprising orienting each two part pattern in one of six orientations for each 3D part packaging design of the first plurality of 3D part packaging designs.

16. The method as in claim 4, wherein the plurality of second CAD models comprises twelve of the second CAD models disposed about the first CAD model on the first plane.

17. The method as in claim 4, further comprising orienting the first CAD model in one of four orientations on the first plane.

18. The method as in claim 17, further comprising orienting the plurality of second CAD models in one of four orientations on the first plane.

19. The computer readable medium as in claim 14, wherein the first CAD model of the manufactured part is identical to the second CAD model.

20. The computer readable medium as in claim 14, wherein each of the first plurality of 3D part packaging designs comprises a plurality of two part patterns, each two part pattern comprising the first CAD model and the second CAD model wherein the first CAD model in disposed at a predetermined position or orientation relative to the second CAD model.

21. The computer readable medium of claim 23, further comprising instructions for having the computer perform the steps of:
disposing the first CAD model of the manufactured part on a first plane;
generating a plurality of second CAD models based on the second CAD model, wherein the second CAD model is identical to the first CAD model; and
disposing the plurality of second CAD models on the first plane in a spatial relationship with the first CAD model, wherein the first CAD model and each second CAD model of the plurality of second CAD models on the first plane comprise a two part pattern of the plurality of two part patterns.

22. The computer readable medium of claim 21, further comprising instructions for having the computer perform the steps of:
   disposing the first CAD model of the manufactured part on a second plane substantially parallel to the first plane;
   disposing the plurality of second CAD models on the second plane in a spatial relationship with the first CAD model, wherein the first CAD model and each second CAD model of the plurality of second CAD models on the second plane comprise a two part pattern of the plurality of two part patterns;
   disposing the first CAD model of the manufactured part on a third plane substantially parallel to the second plane; and
   disposing the plurality of second CAD models on the third plane in a spatial relationship with the first CAD model, wherein the first CAD model and each second CAD model of the plurality of second CAD models on the third plane comprise a two part pattern of the plurality of two part patterns.

23. The computer readable medium of claim 21, further comprising instructions for having the computer orient the first CAD model in one of four orientations on the first plane.

* * * * *